US008788564B2

(12) United States Patent
Tsugihashi et al.

(10) Patent No.: US 8,788,564 B2
(45) Date of Patent: Jul. 22, 2014

(54) INFORMATION PROCESSING APPARATUS, STORAGE MEDIUM, INFORMATION PROCESSING METHOD, AND INFORMATION PROCESSING SYSTEM

(75) Inventors: Kanako Tsugihashi, Kyoto (JP); Ryutaro Takahashi, Kyoto (JP); Tomohiro Fujii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 389 days.

(21) Appl. No.: 12/964,084

(22) Filed: Dec. 9, 2010

(65) Prior Publication Data

US 2012/0078756 A1 Mar. 29, 2012

(30) Foreign Application Priority Data

Sep. 24, 2010 (JP) ................................ 2010-214462

(51) Int. Cl.
*G06F 15/16* (2006.01)

(52) U.S. Cl.
USPC ................ 709/200; 709/220; 463/42; 463/43

(58) Field of Classification Search
CPC ........................ H04N 21/234336; G11B 27/28
USPC .......... 709/200, 203, 223, 224, 220; 715/201, 715/202, 204, 255, 256; 719/313; 705/27.1; 725/51; 463/42, 43; 348/725
See application file for complete search history.

(56) References Cited

U.S. PATENT DOCUMENTS

| | | | | |
|---|---|---|---|---|
| 7,826,709 | B2 * | 11/2010 | Moriya et al. | 715/202 |
| 2007/0271284 | A1 | 11/2007 | Chun et al. | |
| 2008/0261689 | A1 * | 10/2008 | Evans et al. | 463/29 |
| 2009/0225229 | A1 * | 9/2009 | Kobota | 348/725 |
| 2011/0256829 | A1 | 10/2011 | Shimomura | |

FOREIGN PATENT DOCUMENTS

| | | |
|---|---|---|
| JP | 2008-512815 | 4/2008 |
| WO | WO 2010/055720 A1 | 5/2010 |

OTHER PUBLICATIONS

"Nintendo DSi Toriatsukai Setsumeisho Sousa-hen" 2-3 pages, [online], 2008, Nintendo Co., LTD., Retrieved Sep. 15, 2010 through the Internet, http://www.nintendo.co.jp/ds/support/pdf/dsmanual_B.pdf, with a partial translation.

* cited by examiner

*Primary Examiner* — Frantz Jean
(74) *Attorney, Agent, or Firm* — Nixon & Vanderhye, P.C.

(57) ABSTRACT

Provided are application execution means for executing one or more application programs, and metadata accumulation and storage means for accumulating and storing, into a metadata storage section, metadata corresponding to the one or more application programs when the application programs have been executed or become executable. The application execution means executes the one or more application programs which use the metadata stored in the metadata storage section.

27 Claims, 22 Drawing Sheets

29
1
22
21
26
25
24
24
15A
15B
15C
23
16
14E
14D
14B
14A
14C
14F
12
13
14H
14G
11
27
28

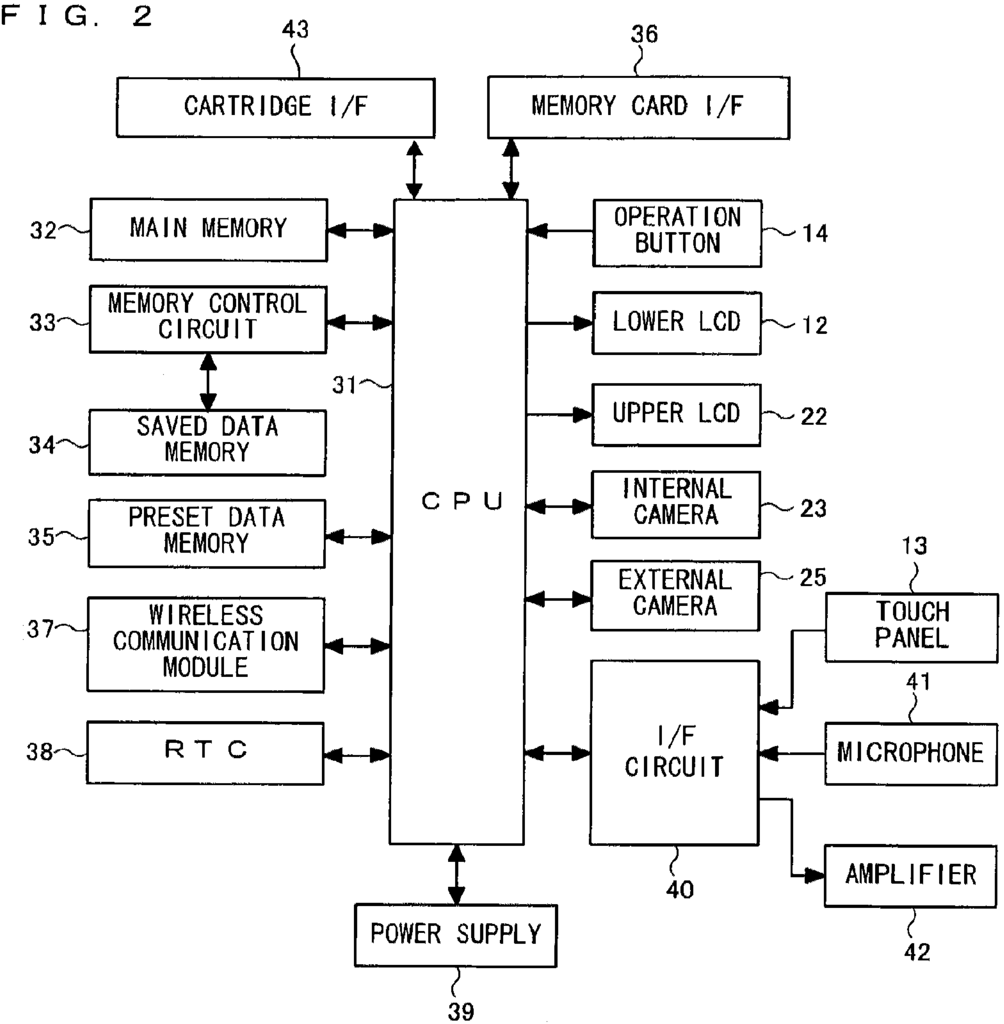
F I G. 2
CARTRIDGE I/F
MEMORY CARD I/F
MAIN MEMORY
MEMORY CONTROL CIRCUIT
SAVED DATA MEMORY
PRESET DATA MEMORY
WIRELESS COMMUNICATION MODULE
R T C
C P U
OPERATION BUTTON
LOWER LCD
UPPER LCD
INTERNAL CAMERA
EXTERNAL CAMERA
TOUCH PANEL
I/F CIRCUIT
MICROPHONE
AMPLIFIER
POWER SUPPLY
43
36
32
33
31
34
35
37
38
14
12
22
23
25
13
41
40
42
39
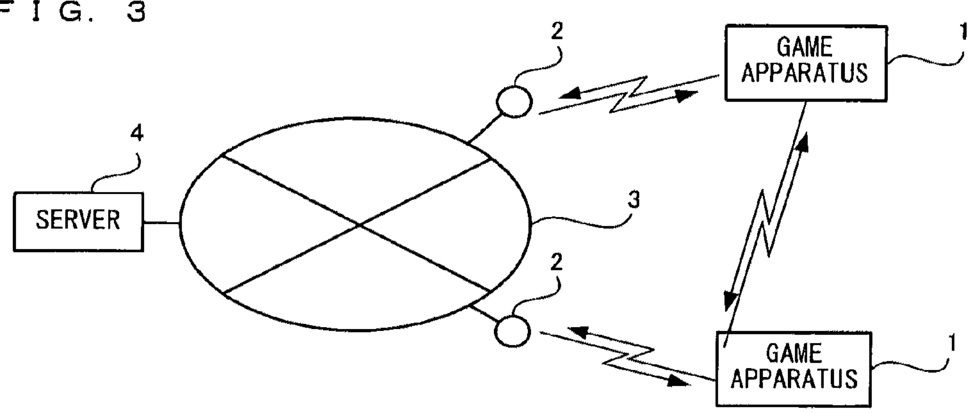
F I G. 3
GAME APPARATUS
SERVER
GAME APPARATUS
1
2
3
4
2
1

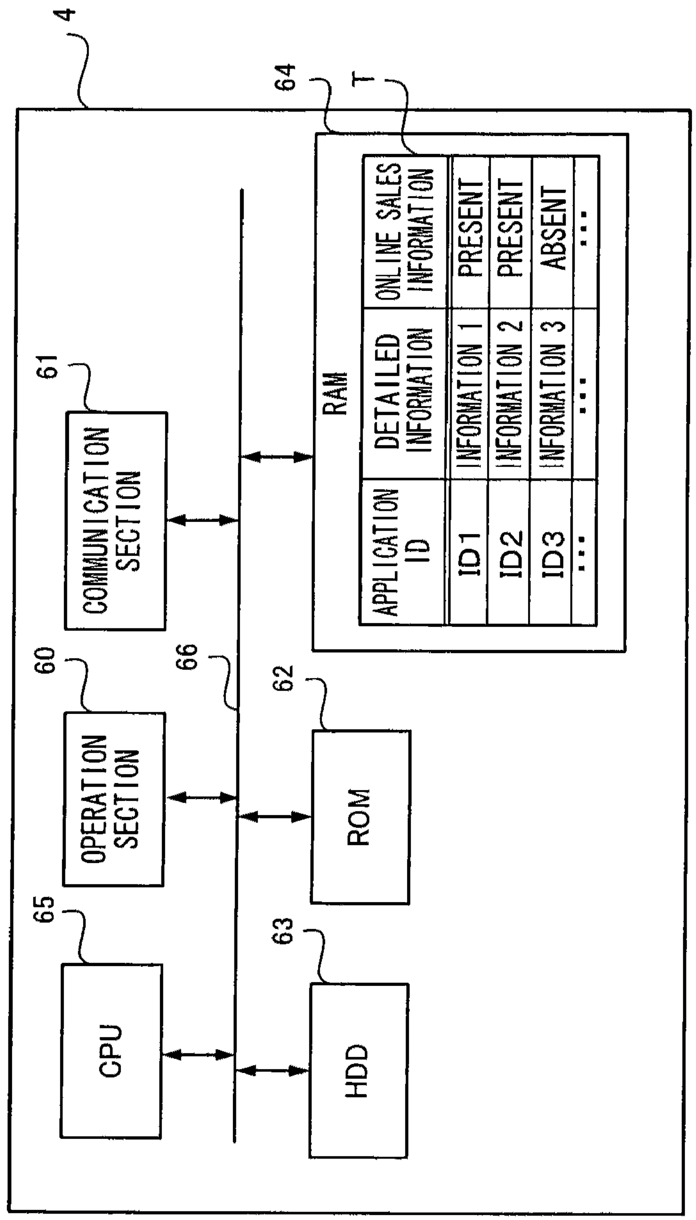
F I G. 4

F I G. 7
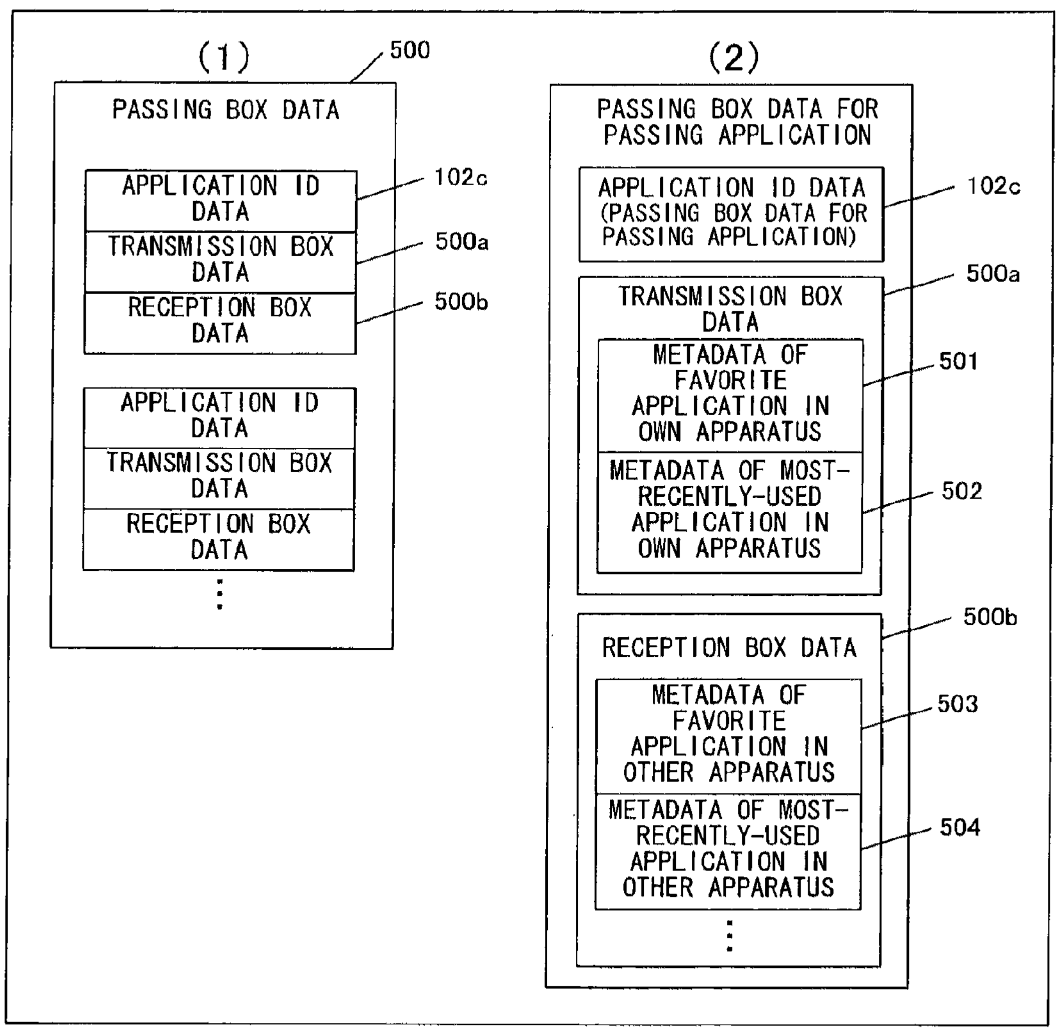

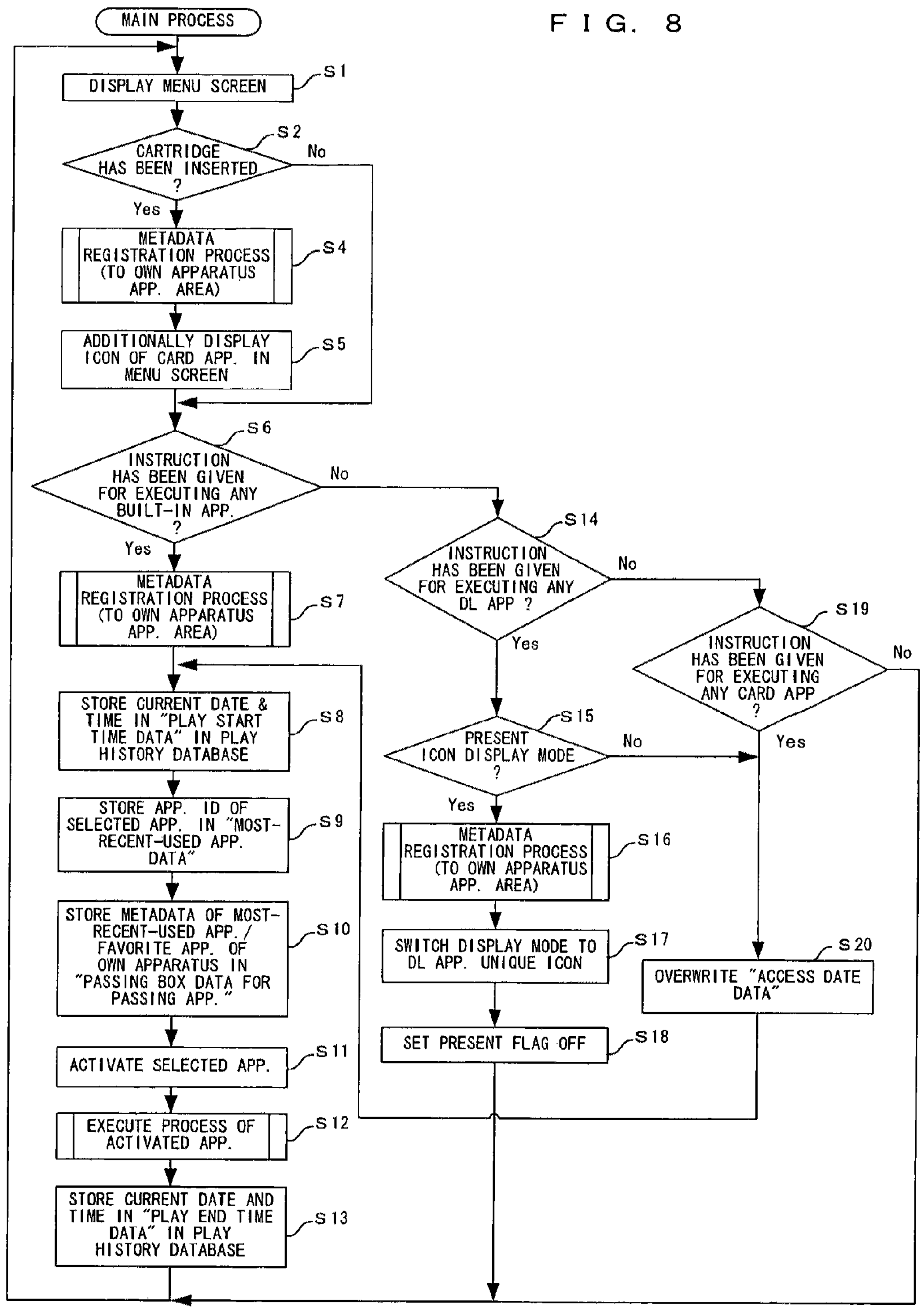
MAIN PROCESS
FIG. 8
DISPLAY MENU SCREEN
S1
CARTRIDGE HAS BEEN INSERTED ?
S2
No
Yes
METADATA REGISTRATION PROCESS (TO OWN APPARATUS APP. AREA)
S4
ADDITIONALLY DISPLAY ICON OF CARD APP. IN MENU SCREEN
S5
INSTRUCTION HAS BEEN GIVEN FOR EXECUTING ANY BUILT-IN APP. ?
S6
No
Yes
METADATA REGISTRATION PROCESS (TO OWN APPARATUS APP. AREA)
S7
STORE CURRENT DATE & TIME IN "PLAY START TIME DATA" IN PLAY HISTORY DATABASE
S8
STORE APP. ID OF SELECTED APP. IN "MOST-RECENT-USED APP. DATA"
S9
STORE METADATA OF MOST-RECENT-USED APP. / FAVORITE APP. OF OWN APPARATUS IN "PASSING BOX DATA FOR PASSING APP."
S10
ACTIVATE SELECTED APP.
S11
EXECUTE PROCESS OF ACTIVATED APP.
S12
STORE CURRENT DATE AND TIME IN "PLAY END TIME DATA" IN PLAY HISTORY DATABASE
S13
INSTRUCTION HAS BEEN GIVEN FOR EXECUTING ANY DL APP ?
S14
No
Yes
PRESENT ICON DISPLAY MODE ?
S15
No
Yes
METADATA REGISTRATION PROCESS (TO OWN APPARATUS APP. AREA)
S16
SWITCH DISPLAY MODE TO DL APP. UNIQUE ICON
S17
SET PRESENT FLAG OFF
S18
INSTRUCTION HAS BEEN GIVEN FOR EXECUTING ANY CARD APP ?
S19
No
Yes
OVERWRITE "ACCESS DATE DATA"
S20

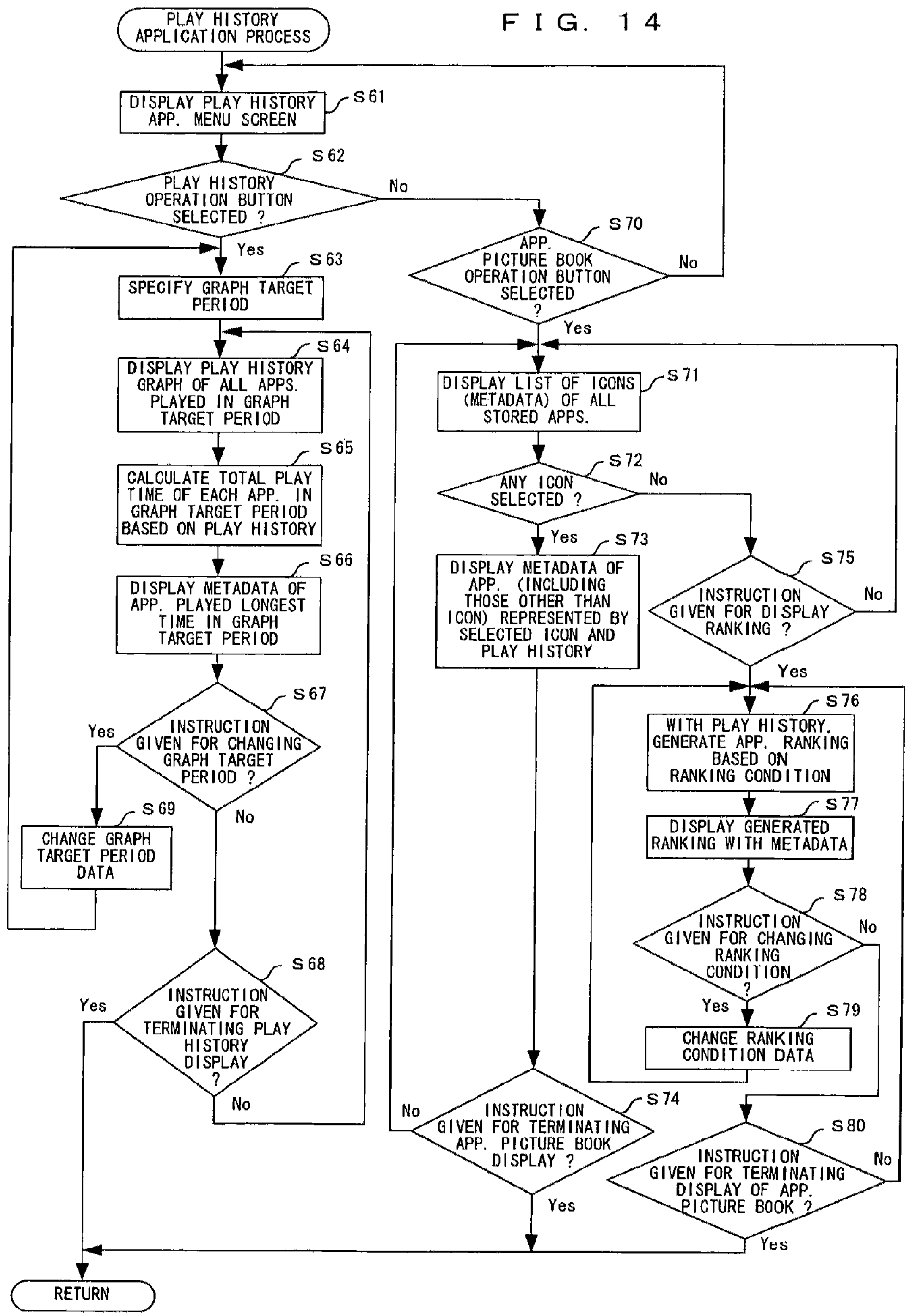
F I G. 14
PLAY HISTORY APPLICATION PROCESS
DISPLAY PLAY HISTORY APP. MENU SCREEN
S61
PLAY HISTORY OPERATION BUTTON SELECTED ?
S62
No
Yes
SPECIFY GRAPH TARGET PERIOD
S63
DISPLAY PLAY HISTORY GRAPH OF ALL APPS. PLAYED IN GRAPH TARGET PERIOD
S64
CALCULATE TOTAL PLAY TIME OF EACH APP. IN GRAPH TARGET PERIOD BASED ON PLAY HISTORY
S65
DISPLAY METADATA OF APP. PLAYED LONGEST TIME IN GRAPH TARGET PERIOD
S66
INSTRUCTION GIVEN FOR CHANGING GRAPH TARGET PERIOD ?
S67
Yes
No
CHANGE GRAPH TARGET PERIOD DATA
S69
INSTRUCTION GIVEN FOR TERMINATING PLAY HISTORY DISPLAY ?
S68
Yes
No
APP. PICTURE BOOK OPERATION BUTTON SELECTED ?
S70
No
Yes
DISPLAY LIST OF ICONS (METADATA) OF ALL STORED APPS.
S71
ANY ICON SELECTED ?
S72
No
Yes
DISPLAY METADATA OF APP. (INCLUDING THOSE OTHER THAN ICON) REPRESENTED BY SELECTED ICON AND PLAY HISTORY
S73
INSTRUCTION GIVEN FOR DISPLAY RANKING ?
S75
No
Yes
WITH PLAY HISTORY, GENERATE APP. RANKING BASED ON RANKING CONDITION
S76
DISPLAY GENERATED RANKING WITH METADATA
S77
INSTRUCTION GIVEN FOR CHANGING RANKING CONDITION ?
S78
No
Yes
CHANGE RANKING CONDITION DATA
S79
INSTRUCTION GIVEN FOR TERMINATING APP. PICTURE BOOK DISPLAY ?
S74
No
Yes
INSTRUCTION GIVEN FOR TERMINATING DISPLAY OF APP. PICTURE BOOK ?
S80
No
Yes
RETURN

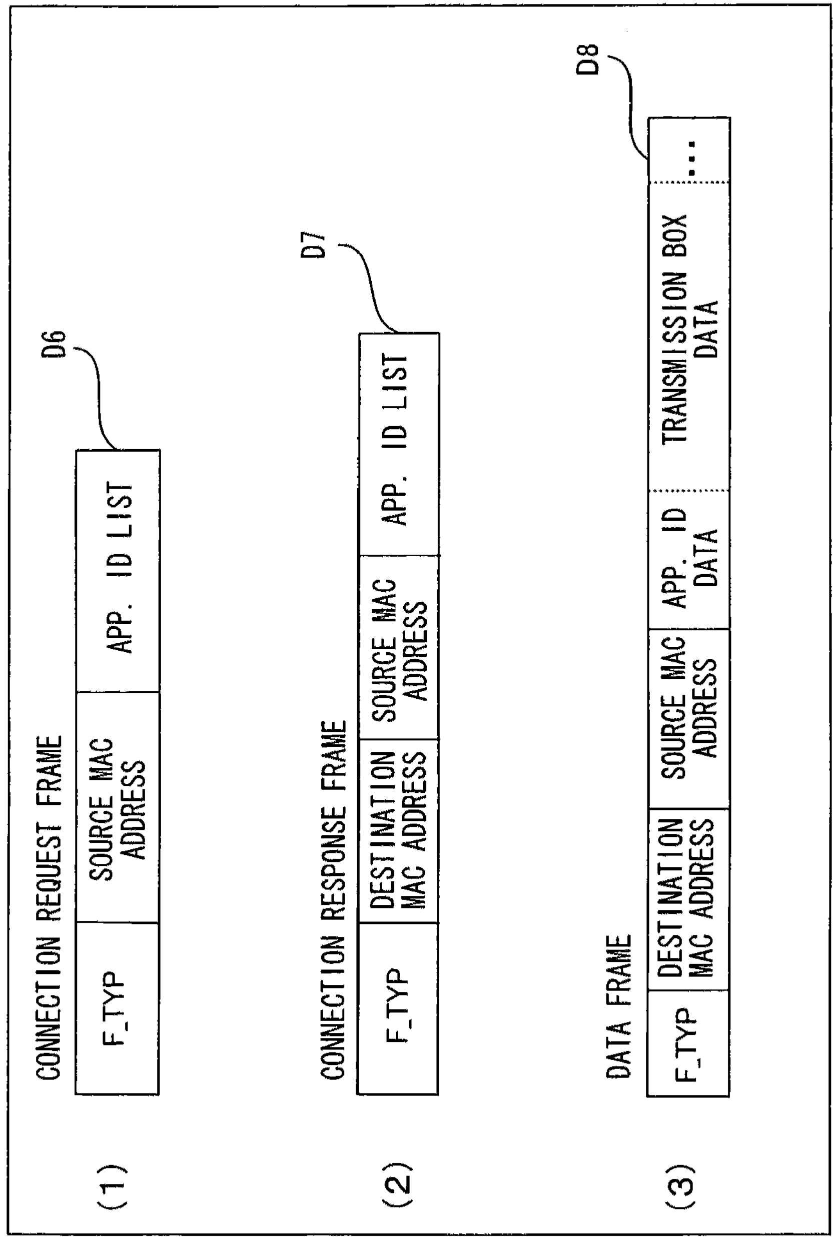
F I G. 1 9
(1)
CONNECTION REQUEST FRAME
F_TYP
SOURCE MAC ADDRESS
APP. ID LIST
D6
(2)
CONNECTION RESPONSE FRAME
F_TYP
DESTINATION MAC ADDRESS
SOURCE MAC ADDRESS
APP. ID LIST
D7
(3)
DATA FRAME
F_TYP
DESTINATION MAC ADDRESS
SOURCE MAC ADDRESS
APP. ID DATA
TRANSMISSION BOX DATA
...
D8

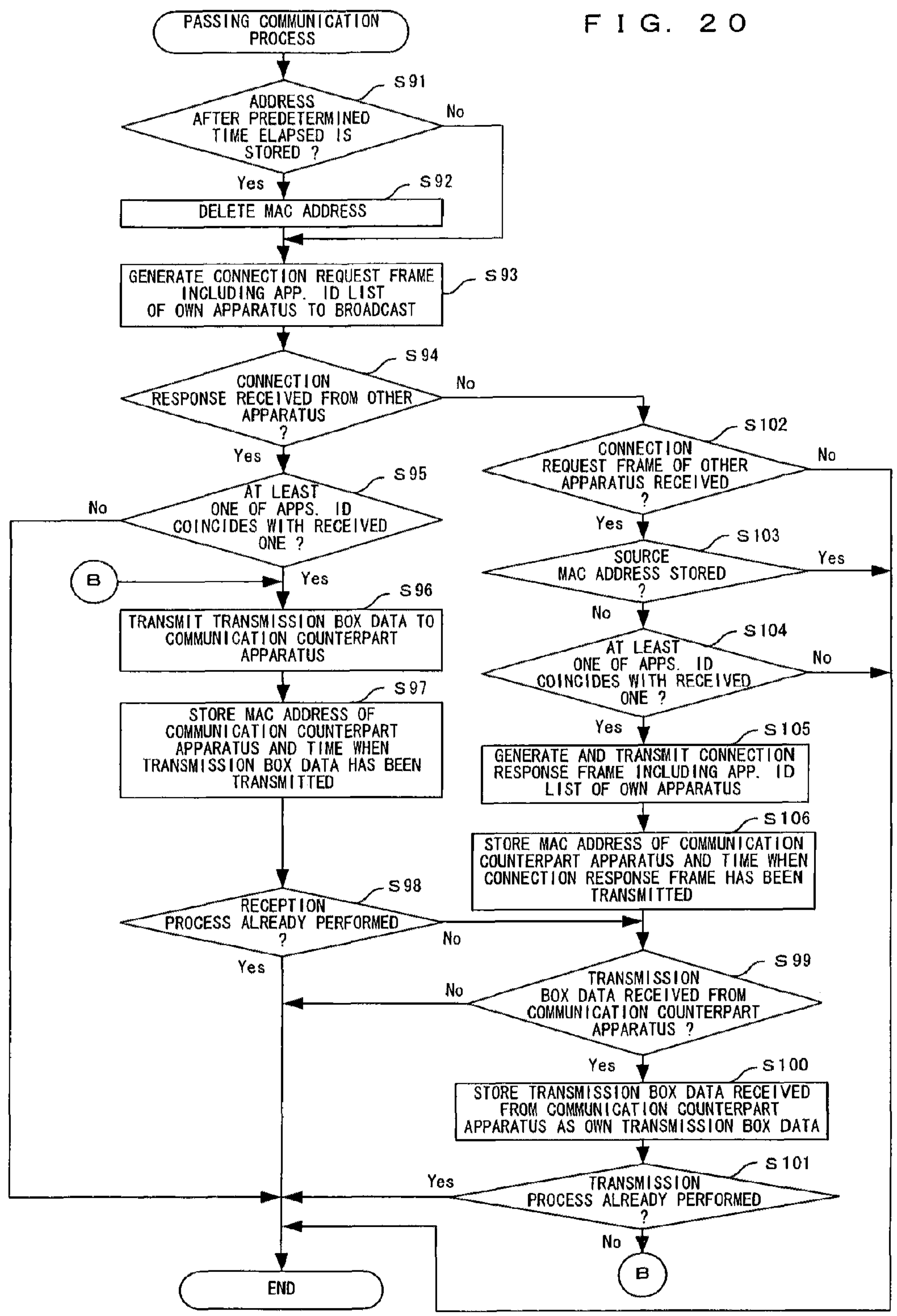
FIG. 20
PASSING COMMUNICATION PROCESS
S91
ADDRESS AFTER PREDETERMINED TIME ELAPSED IS STORED ?
No
Yes
S92
DELETE MAC ADDRESS
S93
GENERATE CONNECTION REQUEST FRAME INCLUDING APP. ID LIST OF OWN APPARATUS TO BROADCAST
S94
CONNECTION RESPONSE RECEIVED FROM OTHER APPARATUS ?
No
Yes
S95
AT LEAST ONE OF APPS. ID COINCIDES WITH RECEIVED ONE ?
No
Yes
B
S96
TRANSMIT TRANSMISSION BOX DATA TO COMMUNICATION COUNTERPART APPARATUS
S97
STORE MAC ADDRESS OF COMMUNICATION COUNTERPART APPARATUS AND TIME WHEN TRANSMISSION BOX DATA HAS BEEN TRANSMITTED
S98
RECEPTION PROCESS ALREADY PERFORMED ?
No
Yes
S102
CONNECTION REQUEST FRAME OF OTHER APPARATUS RECEIVED ?
No
Yes
S103
SOURCE MAC ADDRESS STORED ?
Yes
No
S104
AT LEAST ONE OF APPS. ID COINCIDES WITH RECEIVED ONE ?
No
Yes
S105
GENERATE AND TRANSMIT CONNECTION RESPONSE FRAME INCLUDING APP. ID LIST OF OWN APPARATUS
S106
STORE MAC ADDRESS OF COMMUNICATION COUNTERPART APPARATUS AND TIME WHEN CONNECTION RESPONSE FRAME HAS BEEN TRANSMITTED
S99
TRANSMISSION BOX DATA RECEIVED FROM COMMUNICATION COUNTERPART APPARATUS ?
No
Yes
S100
STORE TRANSMISSION BOX DATA RECEIVED FROM COMMUNICATION COUNTERPART APPARATUS AS OWN TRANSMISSION BOX DATA
S101
TRANSMISSION PROCESS ALREADY PERFORMED ?
Yes
No
B
END

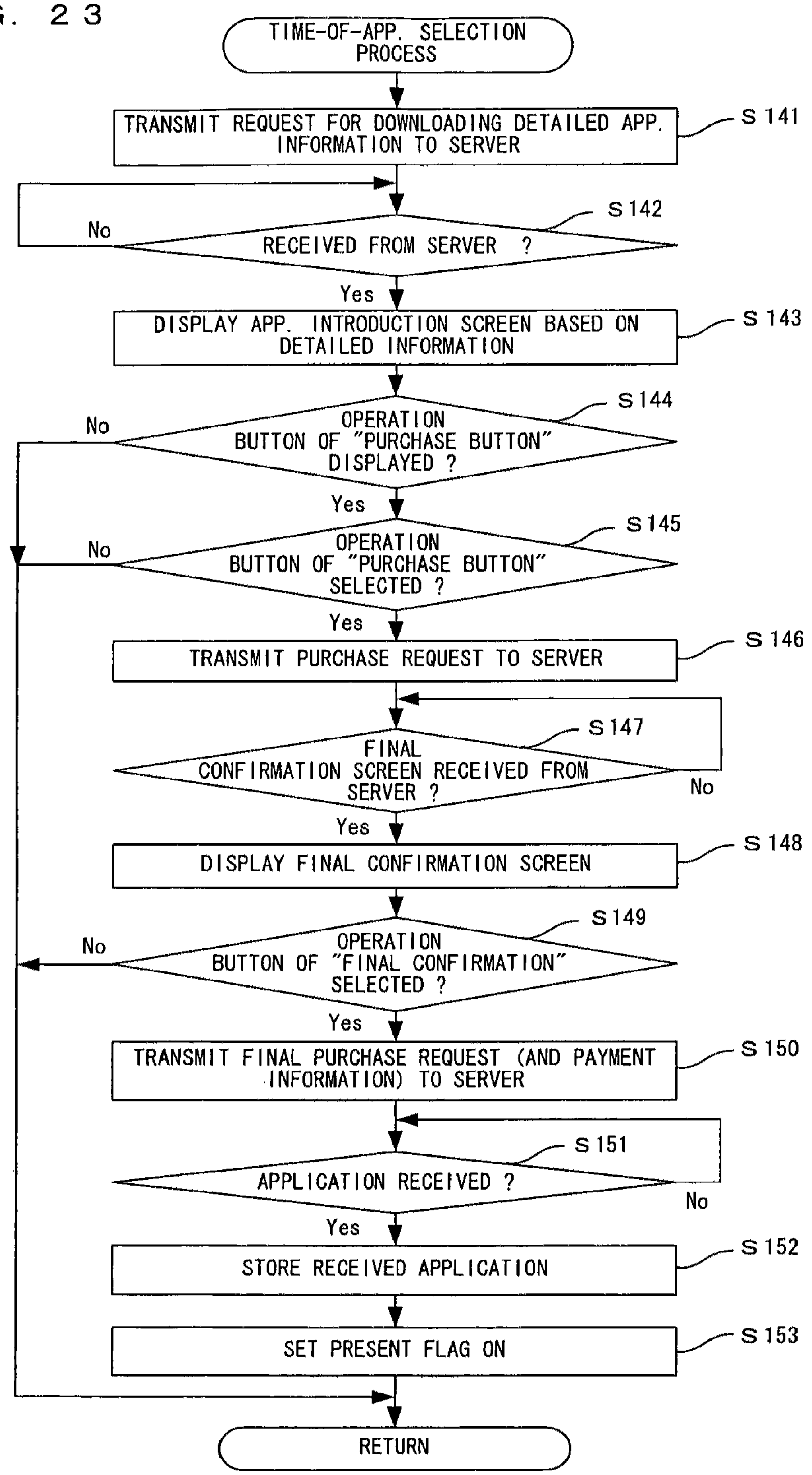
FIG. 23
TIME-OF-APP. SELECTION PROCESS
TRANSMIT REQUEST FOR DOWNLOADING DETAILED APP. INFORMATION TO SERVER
S141
RECEIVED FROM SERVER ?
S142
No
Yes
DISPLAY APP. INTRODUCTION SCREEN BASED ON DETAILED INFORMATION
S143
OPERATION BUTTON OF "PURCHASE BUTTON" DISPLAYED ?
S144
OPERATION BUTTON OF "PURCHASE BUTTON" SELECTED ?
S145
TRANSMIT PURCHASE REQUEST TO SERVER
S146
FINAL CONFIRMATION SCREEN RECEIVED FROM SERVER ?
S147
DISPLAY FINAL CONFIRMATION SCREEN
S148
OPERATION BUTTON OF "FINAL CONFIRMATION" SELECTED ?
S149
TRANSMIT FINAL PURCHASE REQUEST (AND PAYMENT INFORMATION) TO SERVER
S150
APPLICATION RECEIVED ?
S151
STORE RECEIVED APPLICATION
S152
SET PRESENT FLAG ON
S153
RETURN

INFORMATION PROCESSING APPARATUS, STORAGE MEDIUM, INFORMATION PROCESSING METHOD, AND INFORMATION PROCESSING SYSTEM

CROSS REFERENCE TO RELATED APPLICATION

The disclosure of Japanese Patent Application No. 2010-214462, filed Sep. 24, 2010, is incorporated herein by reference.

FIELD

The present invention relates to an information processing apparatus, storage medium, an information processing method, and an information processing system, and more specifically relates to an information processing apparatus, a storage medium, an information processing method, and an information processing system which obtain and utilize metadata of contents.

BACKGROUND AND SUMMARY

Conventionally, there are existing programs for utilizing icons corresponding to applications stored in information processing apparatuses. For example, "Nintendo DSi Toriatsukai Setsumeisho Sousa-hen" 2-3 pages [online], 2008, Nintendo Co., Ltd., retrieved Sep. 15, 2010 through the Internet <URL:http://www.nintendo.co.jp/ds/support/pdf/dsmanual_B.pdf> (Literature 1) discloses menu screens which are displayed when the power supply of a game machine body is turned ON. In such menu screens, icons corresponding to application programs stored in cards (storage unit) inserted in the card slots, or icons corresponding to application programs embedded in the game machine body are displayed.

However, an icon corresponding to an application program stored in a card is displayed in a menu screen disclosed in Literature 1 only when the card is inserted, and when no card is inserted, a predetermined icon representing non-insertion state is displayed. That is, those icons which correspond to applications that are not currently installed are not displayed, and thus it is not possible to understand whether such applications have been activated in the past.

Therefore, an object of the present invention is to provide an information processing apparatus, a storage medium, an information processing method, and an information processing system which accumulate and store metadata corresponding to application programs and thereby enable use of metadata corresponding to application programs that cannot currently be activated or displayed on the menu screen but have been activated or displayed on the menu screen in the past.

The present invention employs the following configuration to solve the above-described problems.

The present invention is an information processing apparatus provided with a metadata storage section, and comprises application execution means and metadata accumulation and storage means. The application execution means executes one or more application programs. The metadata accumulation and storage means accumulates and stores, into the metadata storage section, metadata corresponding to the one or more application programs when the application programs have been executed or become executable. The application execution means executes the one or more application programs which use the metadata stored in the metadata storage section.

According to this configuration, even metadata corresponding to an application program which is not ready to be activated can be used for information processing as long as the application program has been activated in the past.

Further, the application execution means may execute a first application program which uses the metadata stored in the metadata storage section, and a second application program which uses the metadata.

According to this configuration, it is possible to use metadata stored in the metadata storage section for a plurality of application programs.

Further, the first application program may be an application program that performs a first information process by using the metadata stored in the metadata storage section, and the second application program may be an application program that performs a second information process which is different from the first information process, by using the metadata stored in the metadata storage section.

According to this configuration, it is possible to use metadata stored in the metadata storage section as targets of a plurality of different information processes.

Further, the first application program may be an application program that outputs in a first mode the metadata stored in the metadata storage section, and the second application program may be an application program that outputs in a second mode the metadata stored in the metadata storage section which is different from the first mode.

According to this configuration, it is possible to output metadata stored in the metadata storage section in a plurality of modes.

Further, the information processing apparatus may further comprise metadata transmission and reception means for transmitting the metadata stored in the metadata storage section to one or more other information processing apparatuses, and for receiving metadata from the one or more other information processing apparatuses. The metadata accumulation and storage means may further accumulate and store metadata received from the one or more other information processing apparatuses into the metadata storage section.

According to this configuration, since metadata is received from another information processing apparatus, the user can obtain information (metadata) of application programs which are executed on the other apparatus, but have not been executed on the own apparatus.

Further, the metadata transmission and reception means may repeatedly searches for one or more other information processing apparatuses that are present in a short distance wireless communication range for automatically establishing wireless connection therewith, and automatically transmit and receive the metadata to and from the one or more other information processing apparatuses that have been wirelessly connected.

According to this configuration, repetitive transmission and reception are performed between information processing apparatuses automatically, and thus metadata of applications which may be used in the future can be obtained in advance. That is, effective metadata collection can be performed. In addition, metadata is received from another information processing apparatus without being recognized by the user. Thus, when the user is to deal with an application, the user will notice the addition of new metadata, which gives the user a surprise.

Further, the information processing apparatus may further comprise specified apparatus reception means for receiving an operation by a user of specifying one or more of the other information processing apparatuses. The metadata transmission and reception means may transmit the metadata stored in the metadata storage section to the one or more of the other information processing apparatuses specified by the specified apparatus reception means, and receives metadata transmitted from the one or more of the other information processing apparatuses.

According to this configuration, the user and a user of a specified destination information processing apparatus can mutually show applications that the other party does not know.

The application program may output the metadata received from the one or more other information processing apparatuses. The information processing apparatus may further comprise selection reception means for receiving a selection operation by the user of selecting any of the outputted metadata; detailed information obtaining means for obtaining, upon reception of the selection operation by the selection reception means, detailed information on an application program corresponding to the metadata selected by the selection operation; and detailed information output means for outputting the detailed information obtained by the detailed information obtaining means.

According to this configuration, the user can obtain detailed information of an application program represented by the metadata received from another information processing apparatus, by selecting the metadata, and thus the user can easily access the detailed information when the user has obtained metadata of an unknown application program.

Further, the detailed information obtaining means may receive and obtain the detailed information from the server.

According to this configuration, the user obtains detailed information from the server, and thus the user can obtain detailed information related to an application program that is yet to be released before shipping of the information processing apparatus. In addition, the user can obtain the latest detailed information.

Further the detailed information may include guide information for causing the user to purchase the application program corresponding to the metadata selected by the selection operation.

According to this configuration, the user can access, by selecting metadata, the guide information for purchasing an application program represented by metadata received from another information processing apparatus, and thus the user can easily purchase the application.

Further, the information processing apparatus may perform a predetermined transaction process with a server in order to purchase the application program, and when the selection reception means has received the selection operation, the detailed information obtaining means may receive and obtain from the server the detailed information including the guide information.

According to this configuration, the user can easily and quickly purchase content data which is used by another user when the user desires to purchase the content data.

Further, the guide information is information for purchase operation guidance which causes the user to purchase the application program corresponding to the metadata selected by the selection operation. The information processing apparatus may further comprise purchase operation reception means for receiving the purchase operation performed by the user in accordance with the guide information; purchase request transmission means for transmitting to the server a request for purchasing the application program whose purchase operation has been received by the purchase operation reception means; and application reception means for receiving from the server the application program whose purchase has been requested for.

According to this configuration, the user can easily and quickly purchase an application program in accordance with the guide information.

Further, the guide information is information for purchase operation guidance which causes the user to purchase the application program corresponding to the metadata selected by the selection operation. The information processing apparatus may further comprise: purchase operation reception means for receiving the purchase operation performed by the user in accordance with the guide information; purchase request transmission means for transmitting to the server a request for purchasing the application program whose purchase operation has been received by the purchase operation reception means; payment-related information reception means for receiving, from the server, payment-related information for providing the user with guidance on operations for inputting payment information; payment-related information output means for outputting the payment-related information; payment operation reception means for receiving from the user the input of the payment information performed in accordance with the guidance in the payment-related information; payment information transmission means for transmitting to the server the payment information received by the payment operation reception means; and application reception means for receiving from the server the application program whose purchase has been requested for.

According to this configuration, the user can easily and quickly perform a purchase operation which includes a payment process for an application program to be purchased in accordance with the guide information.

Further, the information processing apparatus may further comprise reading means for reading data from an external storage medium which has stored therein an application program and metadata corresponding to the application program, and which is detachably mounted to the information processing apparatus. When data in the external storage medium is read by the reading means, the metadata accumulation and storage means may accumulate and store, into the metadata storage section, the metadata stored in the external storage medium.

According to this configuration, it is possible to store metadata of an application program which is stored in an external storage medium upon its mounting.

Further, the information processing apparatus may further comprise list output means for outputting a list of application programs executable by the application execution means. When any of the application programs in the list has been selected by means of a predetermined operation by the user, the application execution means may execute the selected application program, and the metadata accumulation and storage means may accumulate and store, into the metadata storage section, the metadata corresponding to the selected application program.

According to this configuration, metadata corresponding to an executed application program can be stored upon its execution.

Further, the information processing apparatus may further comprise list output means for outputting a list of application programs executable by the application execution means. When any of the application programs in the list has been selected by means of a predetermined operation by the user, the application execution means may execute the selected application program, and when the list is outputted, the metadata accumulation and storage means may accumulate and store, into the metadata storage section, the metadata corresponding to the application programs included in the list.

According to this configuration, since metadata is accumulated when a list including application programs is outputted, the metadata can be stored along with the outputting of the list.

Further, the application programs may obtain execution time representing how long the application programs have been executed within a predetermined period of time, and output the metadata corresponding to the application programs whose execution time satisfies a predetermined condition.

According to this configuration, metadata corresponding to application programs whose execution time satisfies predetermined conditions is outputted, and thus the user can visually-easily understand the decision result, under a predetermined condition, on the execution time of the application programs.

Further, the application programs may create a list of metadata stored in the metadata storage section, and output the list.

According to this configuration, the user can refer to metadata accumulated and stored in the past.

Further, the metadata may include icons representing the application programs.

According to this configuration, the user can visually-easily recognize the contents of application programs.

Further, the metadata may include titles of the application programs.

According to this configuration, the user can easily recognize the contents of application programs.

In the above description, the present invention is configured as an information processing apparatus. However, the present invention may be configured as an information processing program, an information processing method, or an information processing system. Further, the present invention may be configured as a computer-readable storage medium having stored therein the information processing program.

According to the present invention, it is possible to provide an information processing apparatus, a storage medium, an information processing method, and an information processing system, which enable, in information processing, use of metadata of an application program which cannot be currently activated or displayed on the menu screen but has been activated or displayed on the menu screen in the past, by accumulating and storing the metadata corresponding to the application program.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram illustrating an example of an internal configuration of the game apparatus 1;

FIG. 3 is a diagram illustrating an example of the system according to an embodiment of the present invention;

FIG. 4 is a block diagram illustrating an example of an internal configuration of a server 4 included in the system according to an embodiment of the present invention;

FIG. 7 is a diagram illustrating an example of data in the memory map of the saved data memory 34;

FIG. 8 is a flowchart showing an example of a main process;

FIG. 14 is a flowchart showing an example of a play history application process;

FIG. 19 is a diagram illustrating frames D6 to D8 which are transmitted/received through the passing communication process;

FIG. 20 is a flowchart showing an example of the passing communication process executed by means of the game apparatus 1;

FIG. 23 is a flowchart showing an example of a time-of-application selection process.

DESCRIPTION OF THE PREFERRED EMBODIMENTS

Hereinafter, an embodiment of the present invention will be described with reference to the drawings. It should be noted that the present embodiment should not be deemed to limit the present invention.

(One Embodiment of the Present Invention)

[External Configuration of Game Apparatus]

Figure 1:
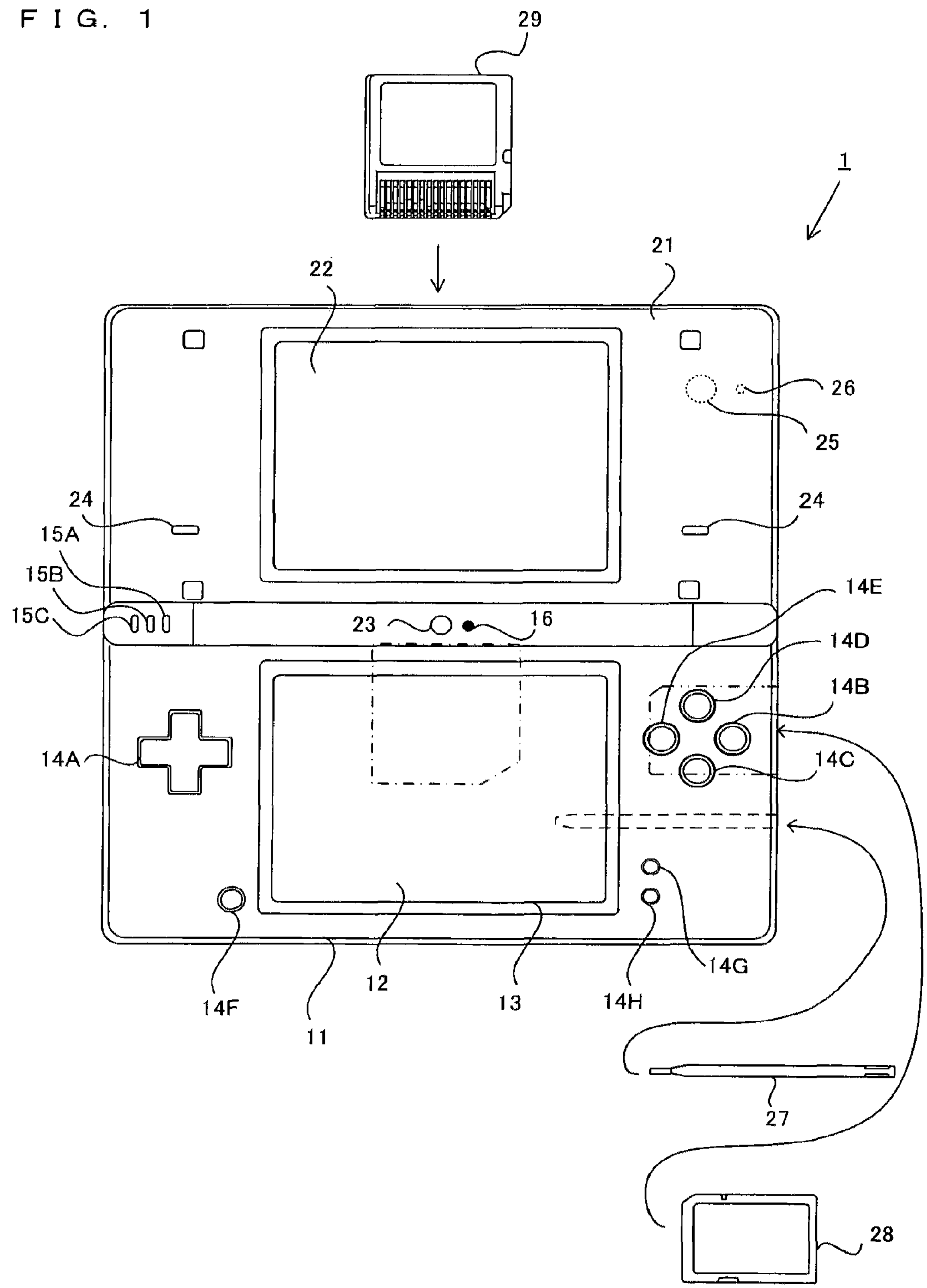
FIG. 1 is a schematic view of a game apparatus 1 included in a system according to an embodiment of the present invention.

FIG. 1 is a schematic view of a game apparatus 1 included in a system according to an embodiment of the present invention. Hereinafter, with reference to FIG. 1, an external configuration of the game apparatus 1, which is an example of an information processing apparatus of the present invention, will be described.

FIG. 1 shows a game apparatus 1 which is a foldable handheld game apparatus. FIG. 1 shows the game apparatus 1 in an opened state. The game apparatus 1 is in a size that allows the user to hold it with his/her one or both hands even when the game apparatus 1 is in the opened state.

The game apparatus 1 includes a lower housing 11 and an upper housing 21. The lower housing 11 and the upper housing 21 are connected to each other in a manner that allows them to be opened and closed (i.e., foldable). In the example of FIG. 1, the lower housing 11 and the upper housing 21 are each formed in a plate-like shape of a horizontally long rectangle, and are rotatably connected at their longer sides. Normally, the user uses the game apparatus 1 in the opened state. When not using the game apparatus 1, the user keeps the game apparatus 1 in the closed state.

The lower housing 11 includes a lower Liquid Crystal Display (LCD) 12. The lower LCD 12 has a horizontally long shape, and is disposed such that the orientation of the longer sides thereof coincides with the orientation of the longer sides of the lower housing 11. Although the LCD is used as a display apparatus that is incorporated in the game apparatus 1 in the present embodiment, any other display apparatus, such as a display apparatus using Electro Luminescence (EL), may be used, for example.

The lower housing 11 includes operation buttons 14A to 14K and a touch panel 13 as input devices. As illustrated in FIG. 1, a direction input button 14A, an operation button 14B, an operation button 14C, an operation button 14D, an operation button 14E, a power button 14F, a start button 14G, and a select button 14H among the operation buttons 14A to 14K are provided at an inner main surface of the lower housing 11, which inner main surface is, when the upper housing 21 and the lower housing 11 are closed, accommodated within the game apparatus 1. The direction input button 14A is used for a selection operation, for example. The operation buttons 14B to 14E are used for a determination operation, a cancellation operation, and the like. The power button 14F is used to power ON/OFF the game apparatus 1. The start button 14G and the select button 14H are used for performing various operations with the game apparatus 1.

The operation buttons 14I to 14K are not shown in FIG. 1. For example, the operation button 14I which is an L-button is provided at the left end of an upper side surface of the lower housing 11, and the operation button 14J which is an R-button is provided at the right end of the upper side surface of the lower housing 11. The L button 14I and R button 14J are used, for example, for giving a photographing instruction (shutter operation) to the game apparatus 1. Further, the operation button 14K which is a sound volume button is provided at a left side surface of the lower housing 11. The sound volume button 14K is used for adjusting the sound volume of loudspeakers provided to the game apparatus 1.

The game apparatus 1 further includes the touch panel 13 as another input device in addition to the operations buttons 14A to 14K. The touch panel 13 is mounted so as to cover the screen of the lower LCD 12. In the present embodiment, a resistive film type touch panel is used as the touch panel 13, for example. However, the touch panel 13 is not limited to the resistive film type touch panel, but may be any press-type touch panel. The touch panel 13 used in the present embodiment has the same resolution (detection accuracy) as that of the lower LCD 12, for example. An insertion opening (indicated by a dashed line in FIG. 1) is provided in a right side surface of the lower housing 11. The insertion opening can accommodate a stylus pen 27 which is used for operations on the touch panel 13.

An insertion opening (indicated by a two-dot chain line in FIG. 1) for accommodating a memory card 28 is also provided in the right side surface of the lower housing 11. Inside the insertion opening, a connector (not shown) is provided for electrically connecting the game apparatus 1 and the memory card 28. The memory card 28 is, for example, a Secure Digital (SD) memory card, and detachably attached to the connector. The memory card 28 is used, for example, for storing (saving) an image captured by the game apparatus 1, and for loading an image generated by another apparatus into the game apparatus 1.

Further, an insertion opening (indicated by a dashed-dotted line in FIG. 1) for accommodating a cartridge 29 is provided in the upper side surface of the lower housing 11. Inside the insertion opening, a connector (not shown) is provided for electrically connecting the game apparatus 1 and the cartridge 29. The cartridge 29 is a storage medium which stores a game program or the like, and the cartridge 29 is detachably inserted into the insertion opening provided in the lower housing 11.

Three LEDs 15A to 15C are mounted at the left side of the connection between the lower housing 11 and the upper housing 21. Here, the game apparatus 1 is capable of performing wireless communication with other apparatuses. The first LED 15A is lit up while the power of the game apparatus 1 is ON. The second LED 15B is lit up while the game apparatus 1 is being charged. The third LED 15C is lit up while the wireless communication is being established. Thus, each of the three LEDs 15A to 15C allows the user to be informed of a state of the game apparatus 1, i.e., whether the game apparatus 1 is ON or OFF, whether the game apparatus 1 is being charged, and whether the wireless communication is being established.

The upper housing 21 includes an upper LCD 22. The upper LCD 22 has a horizontally long shape, and is disposed such that the orientation of the longer sides thereof coincides with the orientation of the longer sides of the upper housing 21. Similar to the lower LCD 12, a display device of any type different from that of the upper LCD 22, or a display device having any resolution different from that of the upper LCD 22 may be used in place of the upper LCD 22. The upper LCD 22 displays, for example, an operation explanation screen for teaching the user the roles of the operation buttons 14A to 14K and the touch panel 13.

The upper housing 21 includes two cameras (the inner camera 23 and the outer camera 25). As shown in FIG. 1, the inner camera 23 is mounted at an inner main surface of the upper housing 21, in the vicinity of the aforementioned connection. On the other hand, the outer camera 25 is mounted at a surface reverse of the inner main surface at which the inner camera 23 is mounted, that is, at the outer main surface of the upper housing 21 (which acts as an external surface of the game apparatus 1 when the game apparatus 1 is in the closed state and which is the back surface of the upper housing 21 shown in FIG. 1). In FIG. 1, the outer camera 25 is indicated by a dashed line. The above arrangement allows the inner camera 23 to capture an image of a view in a direction in which the inner main surface of the upper housing 21 faces, and the outer camera 25 to capture an image of a view in a direction opposite to the image capturing direction of the inner camera 23, that is, an image of a view in a direction in which the outer main surface of the upper housing 21 faces.

A microphone (a microphone 41 shown in FIG. 2) which acts as a sound input device is accommodated inside the inner main surface of the upper housing 21, near the aforementioned connection. Also, in the inner main surface of the upper housing 21, near the connection, a microphone hole 16 is formed so as to allow the microphone 41 to detect a sound outside the game apparatus 1.

At the outer main surface of the upper housing 21, a fourth LED 26 (indicated by a dashed line in FIG. 1) is mounted. The fourth LED 26 is lit up at the time when image capturing is performed by the outer camera 25 (i.e., when the shutter button is pressed). The fourth LED 26 is also lit up while a moving image is being captured by the outer camera 25. The fourth LED 26 allows a subject of image capturing and people in the surroundings to be notified of the image capturing having been performed (or being performed) by the game apparatus 1.

In the inner main surface of the upper housing 21, sound holes 24 are formed to the right and left of the upper LCD 22, respectively, which upper LCD 22 is provided around the center of the inner main surface. Loudspeakers are accommodated in the upper housing 21 at the back of the sound holes 24, respectively. The sound holes 24 are holes for releasing sounds generated by the loudspeakers to the outside of the game apparatus 1.

As described above, the upper housing 21 includes: the inner camera 23 and the outer camera 25 which are provided for capturing images; and the upper LCD 22 which is display means for displaying an operation explanation screen at the time of, for example, image capturing. The lower housing 11 includes: input devices (the touch panel 13 and the buttons 14A to 14K) for input operations on the game apparatus 1; and the lower LCD 12 which is display means for displaying a game screen. Accordingly, when using the game apparatus 1, the user holds the lower housing 11 and perform inputs with the input devices while looking at captured images (images captured by the cameras) displayed on the lower LCD 12.

[Internal Configuration of Game Apparatus]

FIG. 2 is a block diagram showing an example of the internal configuration of the game apparatus 1. Hereinafter, an internal configuration of the game apparatus 1 is described with reference to FIG. 2.

As shown in FIG. 2, the game apparatus 1 includes electronic components such as a Central Processing Unit (CPU) 31, a main memory 32, a memory control circuit 33, a saved data memory 34, a preset data memory 35, a memory card interface (memory card I/F) 36 and a cartridge interface (cartridge I/F) 43, a wireless communication module 37, a real time clock (RTC) 38, a power supply circuit 39, an interface circuit (I/F circuit) 40, and the like. These electronic components are mounted on an electronic circuit board and accommodated in the lower housing 11 (or in the upper housing 21).

The CPU 31 is information processing means for executing predetermined programs. In the present embodiment, predetermined programs are stored in an internal memory of the game apparatus 1 (e.g., the saved data memory 34), the memory card 28, and the cartridge 29. Upon execution of the predetermined program, the CPU 31 executes a main process to be described later, and various application execution processes in the main process.

Note that programs to be executed by the CPU 31 may be stored in advance in an internal memory of the game apparatus 1, or may be obtained from the memory card 28 and/or the cartridge 29, or may be obtained from another apparatus through communication therewith. For example, such programs may be obtained by means of downloading via the Internet from a predetermined server, or may be obtained by downloading a predetermined program stored in a stationary game apparatus through communication with the stationary game apparatus.

The main memory 32, the memory control circuit 33, and the preset data memory 35 are connected to the CPU 31. The saved data memory 34 is connected to the memory control circuit 33. The main memory 32 is storage means used as a work area and a buffer area for the CPU 31. In other words, the main memory 32 stores various data to be used in the processes executed by the CPU 31, and also stores a program obtained from the outside (e.g., from the memory card 28, the cartridge 29, another apparatus, or the like). In the present embodiment, a Pseudo-SRAM (PSRAM) is used as the main memory 32, for example. The saved data memory 34 is storage means for storing a program to be executed by the CPU 31, data of images captured by the inner camera 23 and the outer camera 25, and the like. The saved data memory 34 is structured as a nonvolatile storage medium, and is structured as a NAND flash memory in the present embodiment, for example. The memory control circuit 33 controls, in accordance with instructions from the CPU 31, reading and writing of data from and into the saved data memory 34. The preset data memory 35 is storage means for storing data (preset data), such as various parameters preset in the game apparatus 1. A flash memory connected to the CPU 31 via a Serial Peripheral Interface (SPI) bus can be used as the preset data memory 35.

The memory card I/F 36 is connected to the CPU 31. The memory card I/F 36 reads and writes data from and into the memory card 28 attached to the connector, in accordance with instructions from the CPU 31.

The cartridge I/F 43 is connected to the CPU 31. The cartridge I/F 43 reads and writes data from and into the cartridge 29 attached to the connector, in accordance with instructions from the CPU 31. In the present embodiment, an application program is read from the cartridge 29 to be executed by the CPU 31, and data relating to the application program (e.g. saved data of a game) is written into the cartridge 29.

The wireless communication module 37 has a function of connecting to a wireless LAN, for example, by a method conformed to the standard of IEEE802.11b/g. The wireless communication module 37 is connected to the CPU 31. The CPU 31 is capable of transmitting/receiving data to/from another apparatus via the Internet (or without using the Internet) by means of the wireless communication module 37.

The wireless communication module 37 has a function of performing wireless communication with a game apparatus of the same type as the game apparatus 1 via a predetermined communication method. Here, radio waves that the wireless communication module 37 uses in the wireless communication are, for example, weak radio waves, the use of which does not require a radio station license. For example, the wireless communication module 37 performs short-distance wireless communication of which the data transmission distance is within a range of 10 m. Accordingly, by means of the wireless communication module 37, the CPU 31 can transmit/receive data to/from another game apparatus 1 when a distance between the location of the CPU 31 and the location of this other game apparatus 1 is within a communicable range (e.g., when the distance is equal to or shorter than 10 m). The data transmission/reception is performed not only when an instruction is received from the user but is automatically repeated at a predetermined cycle without reception of an instruction from the user. That is, the CPU 31 searches for another game apparatus 1 whose distance from the CPU 31 is within the communicable range. Then, the core 31A automatically establishes communication with another game apparatus 1 which is found as a result of the search, and automatically transmits/receives data to/from this other game apparatus 1. After the communication is completed, the core 31A automatically disconnects the communication. Such a series of processing is repeated at a predetermined cycle. Hereinafter, this type of communication is referred to as "passing communication". A process performed for the passing communication is hereinafter referred to as a "passing communication process". The passing communication process will be described later particularly with reference to FIG. 20.

The RTC 38 and the power supply circuit 39 are connected to the CPU 31. The RTC 38 counts time, and outputs the time to the CPU 31. For example, the CPU 31 is capable of calculating a current time (date) and the like based on the time counted by the RTC 38. The power supply circuit 39 controls power supplied from a power source (typically, a battery accommodated in the lower housing 11) of the game apparatus 1 to supply the power to the components of the game apparatus 1.

The game apparatus 1 includes the microphone 41 and an amplifier 42. The microphone 41 and the amplifier 42 are connected to the I/F circuit 40. The microphone 41 detects a voice of the user uttered toward the game apparatus 1, and outputs sound signals indicative of the voice to the I/F circuit 40. The amplifier 42 amplifies sound signals from the I/F circuit 40, and causes the loudspeakers (not shown) to output the amplified signals. The I/F circuit 40 is connected to the CPU 31.

The touch panel 13 is connected to the I/F circuit 40. The I/F circuit 40 includes a sound control circuit for controlling the microphone 41 and the amplifier 42 (i.e., the loudspeakers), and includes a touch panel control circuit for controlling the touch panel 13. The sound control circuit performs A/D conversion or D/A conversion of a sound signal, or converts a sound signal into sound data in a predetermined format. The touch panel control circuit generates touch position data in a predetermined format based on a signal from the touch panel 13, and outputs the touch position data to the CPU 31. For example, the touch position data indicates coordinates of a position on an input surface of the touch panel 13, at which position an input has been performed. The touch panel control circuit reads a signal from the touch panel 13 and generates touch position data every predetermined period. By obtaining the touch position data via the I/F circuit 40, the CPU 31 can recognize a position on the touch panel 13, at which position an input has been performed.

Operation buttons 14 include the above-described operation buttons 14A to 14K, and are connected to the CPU 31. The operation buttons 14 output, to the CPU 31, operation data indicating input states of the operation buttons 14A to 14K (i.e., indicating whether the operation buttons 14A to 14K are being pressed). The CPU 31 obtains the operation data from the operation buttons 14, and thereby performs processing in accordance with inputs that have been performed via the operation buttons 14.

The inner camera 23 and the outer camera 25 are connected to the CPU 31. Each of the inner camera 23 and the outer camera 25 captures an image in accordance with an instruction from the CPU 31, and outputs data of the captured image to the CPU 31.

The lower LCD 12 and the upper LCD 22 are connected to the CPU 31. Each of the lower LCD 12 and the upper LCD 22 displays an image in accordance with an instruction from the CPU 31.

[System According to Present Embodiment]

FIG. 3 is a diagram illustrating an example of the system according to the present embodiment. As illustrated in FIG. 3, the system according to the present embodiment includes a plurality of game apparatuses 1 and a server 4 which is communicably connected to the plurality of game apparatuses 1 via access points 2 and a network 3. The plurality of game apparatuses 1 perform the passing communication, without using the server 4 or network 3, thereby transmitting/receiving data (metadata) to/from each other. Alternatively, like a so-called peer-to-peer (P2P) communication, the game apparatuses can transmit/receive data through communication using the network 3 without using the server 4. Accordingly, the users of the plurality of game apparatuses 1 can know metadata of applications mutually executed. Here, metadata of an application represents information relating to the application, and for example, an icon representing the application, or the title of the application. The metadata will be described later with reference to FIG. 6(1).

FIG. 3 shows only two game apparatuses 1. However, the system of the present embodiment may include three or more game apparatuses 1. Moreover, the system of the present embodiment may include a plurality of servers 4. The network 3 is a wired or wireless network such as the Internet, WAN, LAN, or the like.

[Internal Configuration of Server]

FIG. 4 is a block diagram showing an example of an internal configuration of the server 4 included in the system according to the present embodiment. As illustrated in FIG. 4, the server 4 includes an operation section 60, a communication section 61, a ROM 62, an HDD 63, a RAM 64, and a CPU 65, which are communicably connected with one another via a bus 66.

The operation section 60 has a function of receiving an operation performed by the administrator of the server 4. The communication section 61 has a function of communicating with another apparatus via the network 3. The ROM 62 stores a system program for starting the server 4 and for realizing fundamental functions of the server 4. The HDD 63 stores programs including a communication program for allowing the server 4 to communicate with the game apparatuses 1, and stores data necessary for executing the programs. The data contains detailed information to be downloaded by the game apparatuses 1. The RAM 64 acts as a work area for the CPU 65 and stores a table T which is read from the HDD 63. In the table T, application IDs, detailed information, and online sales information are registered while being associated with the corresponding applications. The online sales information indicates whether the applications are sold online through the server 4.

In response to a request from game apparatuses 1 for distribution of detailed information, the CPU 65 searches the table T for an application ID that is contained in the request. The CPU 65 then reads detailed information that is associated with the application ID, and transmits the detailed information to the game apparatus 1 that has made the request.

[Outline of Processing Executed on Game Apparatus]

Hereinafter, an outline of processing executed on the game apparatus 1 will be described. Applications executed on the game apparatus 1 are divided into a built-in application, a card application, and a download application (hereinafter DL application).

The built-in applications are stored in advance in the game apparatuses 1 before shipping of the game apparatuses 1 from the manufacture (or upon release of the game apparatuses 1). When a built-in application is initially executed on a game apparatus 1, metadata of the built-in application is registered (stored) in the game apparatus 1.

The card applications are stored in the cartridges 29 or the memory cards 28 (see FIG. 1). When a cartridge 29 is initially inserted into the insertion opening (indicated by a dashed-dotted line in FIG. 1) of a game apparatus 1, or when a memory card 28 is initially inserted into the insertion opening (indicated by a two-dot chain line in FIG. 1) of the game apparatus 1, the game apparatus 1 registers metadata of a card application stored in the cartridge 29 or the memory card 28. Alternatively, in the case where a cartridge 29 or a memory card 28 was inserted in the game apparatus 1 and metadata of an application stored therein was registered once in the past, but the metadata was thereafter deleted due to some reason such as excessive number of registrations, the metadata of the application in the cartridge 29 or memory card 28 will be registered in the game apparatus 1 when the cartridge 29 or memory card 28 is again inserted in the game apparatus 1.

Here, a card application stored in a cartridge 29 or memory card 28 is executable on the game apparatus 1 when the cartridge 29 or memory card 28 is being accommodated (mounted) in the game apparatus 1, whereas a card application is not executable on the game apparatus 1 when the cartridge 29 or memory card 28 is removed from the game apparatus 1. In the description below, for the sake of simple explanation, only the applications that are stored in the cartridge 29 will be described as card applications, and applications that are stored in the memory card 28 will not be described. However, the description can be also applied to the applications stored in the memory card 28.

The DL applications are such applications that are downloaded, wired or wirelessly, from the outside of the game apparatus 1 (typically, from the server 4). Here, when a DL application has been downloaded to the game apparatus 1, the DL application is represented by a present icon, and the icon is displayed on the lower LCD 12 (or upper LCD 22). Generally, regardless of the types of applications, the present icon of the same display mode (e.g., a present box icon with ribbon) is used for them. When a user has selected a present icon, the present icon will change to an icon of a display mode unique to the corresponding DL application. Accordingly, the user can recognize at a glance an icon of a DL application that is never executed. When the present icon of a DL application has been selected by the user, and the display mode has been changed to such a unique display mode, the game apparatus 1 registers the metadata of the DL application.

That is, the game apparatus 1 registers the metadata of the application when the application is to be executed thereon, or when the application becomes ready to be executed.

In addition, the game apparatus 1 transmits to or receives from another game apparatus 1 metadata of an application that is registered as a favorite (hereinafter referred to as a "favorite application") or an application that is most recently used or being used (hereinafter referred to as a "most-recently-used application") in accordance with operations by the user or automatically. The metadata having been received is registered by the game apparatus 1. For example, upon execution of a friend application, the game apparatus 1 transmits/receives metadata of the favorite applications and most-recently-used applications to/from another game apparatus 1 that is registered as a friend, and another game apparatus 1 that has been newly registered as a friend. The process of the friend application will be described later with reference to FIG. 11. In addition, for example, the game apparatus 1 executes the passing communication process, and thereby transmits/receives metadata of the favorite applications and most-recently-used applications automatically to/from another game apparatus 1 every predetermined period. The passing communication process will be described later with reference to FIG. 20. Meanwhile, for example, upon execution of the message application, the game apparatus 1 transmits/receives messages to/from another game apparatus 1 via the server 4, and at this time, there may be a case where the game apparatus 1 transmits/receives metadata of an application specified by the user. A process of a message application like this will be described later with reference to FIG. 22.

The metadata of an application executed on the game apparatus 1, or the metadata received from another game apparatus 1 are used for a plurality of applications. For example, in the process of the friend application, the game apparatus 1 displays thereon metadata of a favorite application and most-recently-used application of another game apparatus 1 which is registered as a friend. In addition, for example, in the process of a play history application, the game apparatus 1 displays thereon metadata of an application that is played the highest number of times on the apparatus during a target period, or displays a list of all pieces of metadata stored in the apparatus. The process of the play history application will be described later with reference to FIG. 14. Meanwhile, in the process of a passing application, for example, the game apparatus 1 displays thereon metadata of the favorite applications and most-recently-used applications of another game apparatus 1 with which the apparatus performed passing communication in the past. A time-of-application selection process is executed on the game apparatus 1 in response to the user's operation, and then detailed information on applications corresponding to the displayed metadata, purchase information (guide information) contained in the detailed information, and the applications themselves are downloaded from the server. The time-of-application selection process will be described later with reference to FIG. 23. Meanwhile, for example, when the game apparatus 1 has received metadata during the process of the message application, the time-of-application selection process is executed in response to the user's operation, and then detailed information of applications corresponding to the received metadata, purchase information included therein, and applications themselves are downloaded from the server.

As described above, metadata of applications executed on the game apparatus 1 is registered in the game apparatus 1, and in addition, metadata of the applications received through the above-described various communication processes with other game apparatuses 1 can be also registered in the game apparatus 1. The metadata registered in the game apparatus 1 can be utilized for various applications. In addition, metadata of a card application stored in a cartridge 29 which was mounted to the game apparatus 1 in the past but is currently removed (i.e., application which was executed on the game apparatus 1 in the past but is not currently installed therein) can be utilized for various applications.

[Memory Map of Saved Data Memory]

Figure 5:
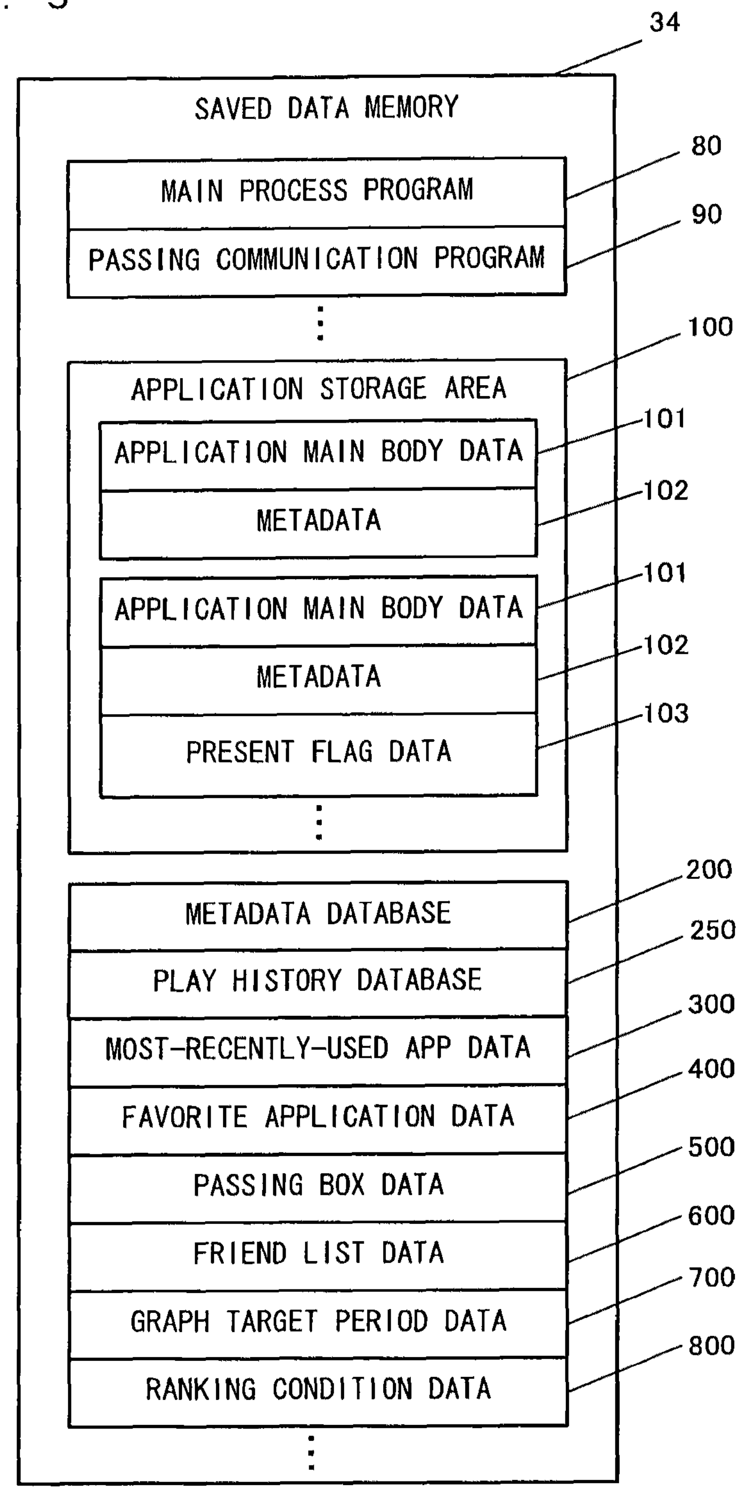
FIG. 5 is a diagram illustrating an example of a memory map of a saved data memory 34.

Next, details of the processes executed on the game apparatus 1 will be described in detail. To begin with, with reference to FIG. 5 to FIG. 7, data stored in the saved data memory 34 will be described. FIG. 5 is a diagram illustrating an example of a memory map of the saved data memory 34 in the game apparatus 1. As illustrated in FIG. 5, the saved data memory 34 stores therein various programs such as a main process program 80 and a passing communication program 90. In addition, the saved data memory 34 includes an application storage area 100, and the application storage area 100 stores therein built-in applications and DL applications each composed of a set of application main body data 101 and metadata 102. Here, in the case of a DL application, present flag data 103 is stored together with the application main body data 101 and the metadata 102. In addition, the saved data memory 34 also stores therein various data such as a metadata database 200, a play history database 250, most-recently-used app data 300, favorite application data 400, passing box data 500, friend list data 600, graph target period data 700, and ranking condition data 800.

The application main body data 101 and metadata 102 of the built-in applications are already stored in the saved data memory 34 before shipping from the manufacturer. In addition, the application main body data 101 and metadata 102 of the DL applications are stored in the saved data memory 34 upon downloading of these pieces of data.

Upon execution of each application, the CPU 31 loads the above-described data (including applications and programs) in the saved data memory 34 into the main memory 32, uses the data as necessary, and stores or overwrites the data as necessary. Accordingly, the CPU 31 executes the process of each application using the data loaded into the main memory 32. The application main body data 101 and metadata 102 of the card application stored in the cartridge 29 are not stored in the saved data memory 34, but the CPU 31 loads the application main body data 101 and metadata 102 in the cartridge 29 directly into the main memory 32, and executes processing.

The main process program 80 is designed to realize a main process to be described later with reference to FIG. 8.

The passing communication program 90 is designed to realize a passing communication process to be described later with reference to FIG. 20.

The application main body data 101 is main body data of an application. The application main body data 101 is, for example, the main body data of the friend application to be described later with reference to FIG. 11, the main body data of the play history application to be described later with reference to FIG. 14, the main body data of the passing application to be described later with reference to FIG. 21, the main body data of the message application to be described later with reference to FIG. 22, the main body data of various game applications, and the like.

The metadata 102 indicates information relating to an application represented by the corresponding application main body data 101. The metadata 102 will be hereinafter described in detail with reference to FIG. 6 (1). The metadata 102 includes icon image (large) data 102*a*, icon image (small) data 102*b*, application ID data 102*c*, version data 102*d*, title (short) data 102*e*, title (long) data 102*f*, vendor name data 102*g*, destination (region) data h, rating data 102*i*, access date data 102*j*, and the like.

The icon image (large) data 102*a* is data of an image visually representing an application and having a relatively large size. The icon image (small) data 102*b* is data of an image visually representing an application and having a relatively small size. The application ID data 102*c* is data representing an identifier unique to an application. The version data 102*d* is data representing a version of an application. The title (short) data 102*e* is data representing a relatively short title (e.g., an abbreviated title) of an application. The title (long) data 102*f* is data representing a relatively long title (e.g., a full title) of an application. The vendor name data 102*g* is data representing the name of the vender of an application. The destination (region) data h is data representing the destination of an application. The rating data 102*i* is data representing rating of an application, and is, for example, data indicating that juveniles cannot use the application. The access date data 102*j* is data representing the time of the last access to an application.

The present flag data 103 is data representing a present flag defining the display mode of an icon of a DL application. If the present flag is ON, the present icon is to be displayed for the icon of a DL application, whereas if the present flag is OFF, icon unique to a DL application is to be displayed for the application.

The metadata database 200 is a database of the metadata 102. Hereinafter, with reference to FIG. 6 (2), the metadata database 200 will be described in detail. The metadata database 200 includes an own apparatus application area 201 and other apparatus application area 202. In the own apparatus application area, 201, metadata 102 of applications is stored, which have been executed or made ready for execution on the own game apparatus 1 (specifically by inserting a cartridge 29 or the like into the game apparatus 1). In the other apparatus application area 202, metadata 102 of favorite applications 400 and most-recently-used applications 300 is stored which have been obtained from another game apparatus 1 through, for example, a passing application process to be described later (see FIG. 22).

Figure 6:
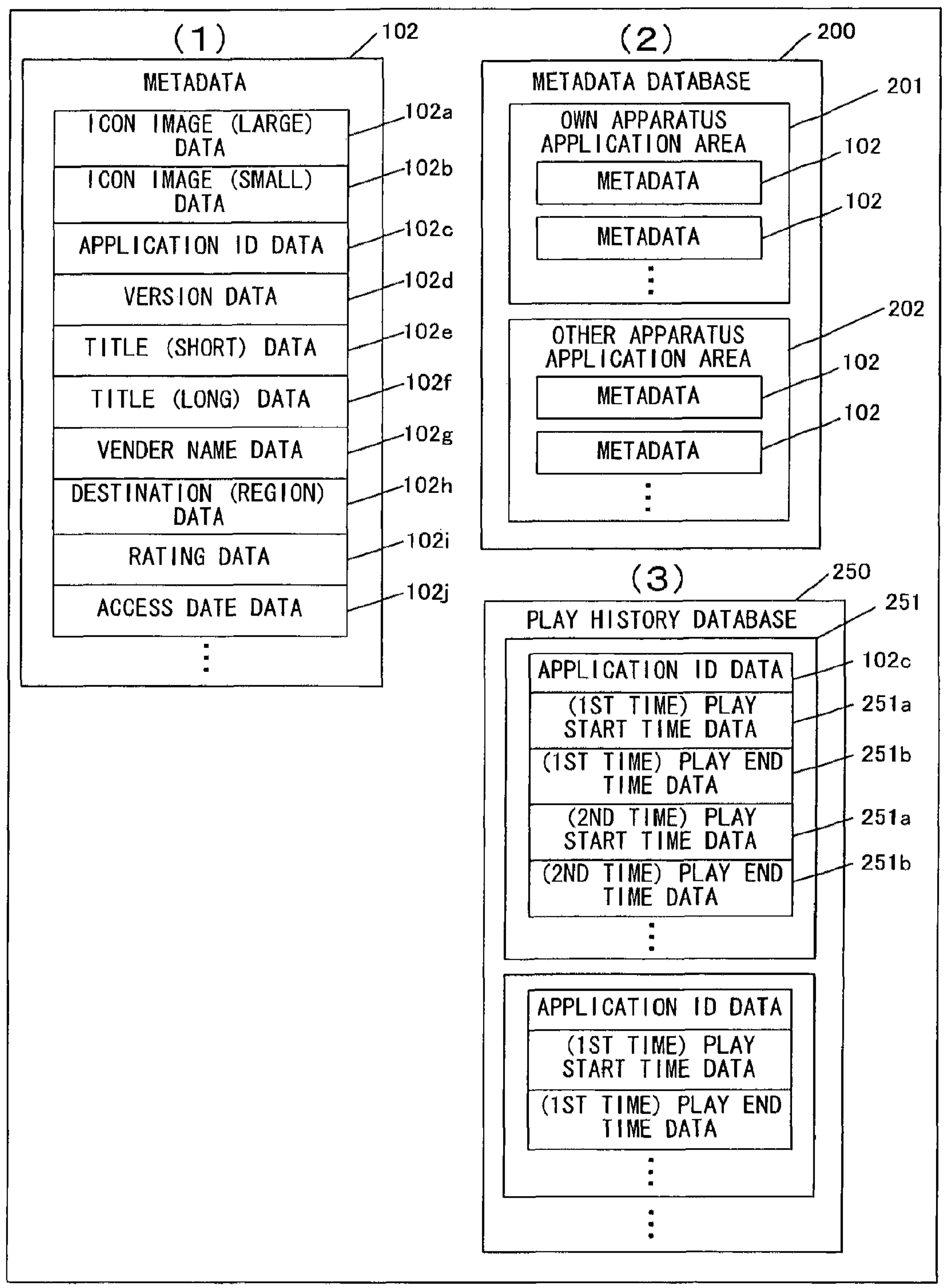
FIG. 6 is a diagram illustrating an example of data in the memory map of the saved data memory 34.

As illustrated in FIG. 6 (3), the play history database 250 stores therein play data 251 of respective applications. Each piece of the play data 251 is composed of application ID data 102*c* representing an application having been played, play start time data 251*a* representing time and date of play start, and play end time data 251*b* representing time and date of play end.

The most-recently-used app data 300 is data (typically, application ID data) representing an application having been executed most recently or being executed currently on the game apparatus 1.

Figure 11:
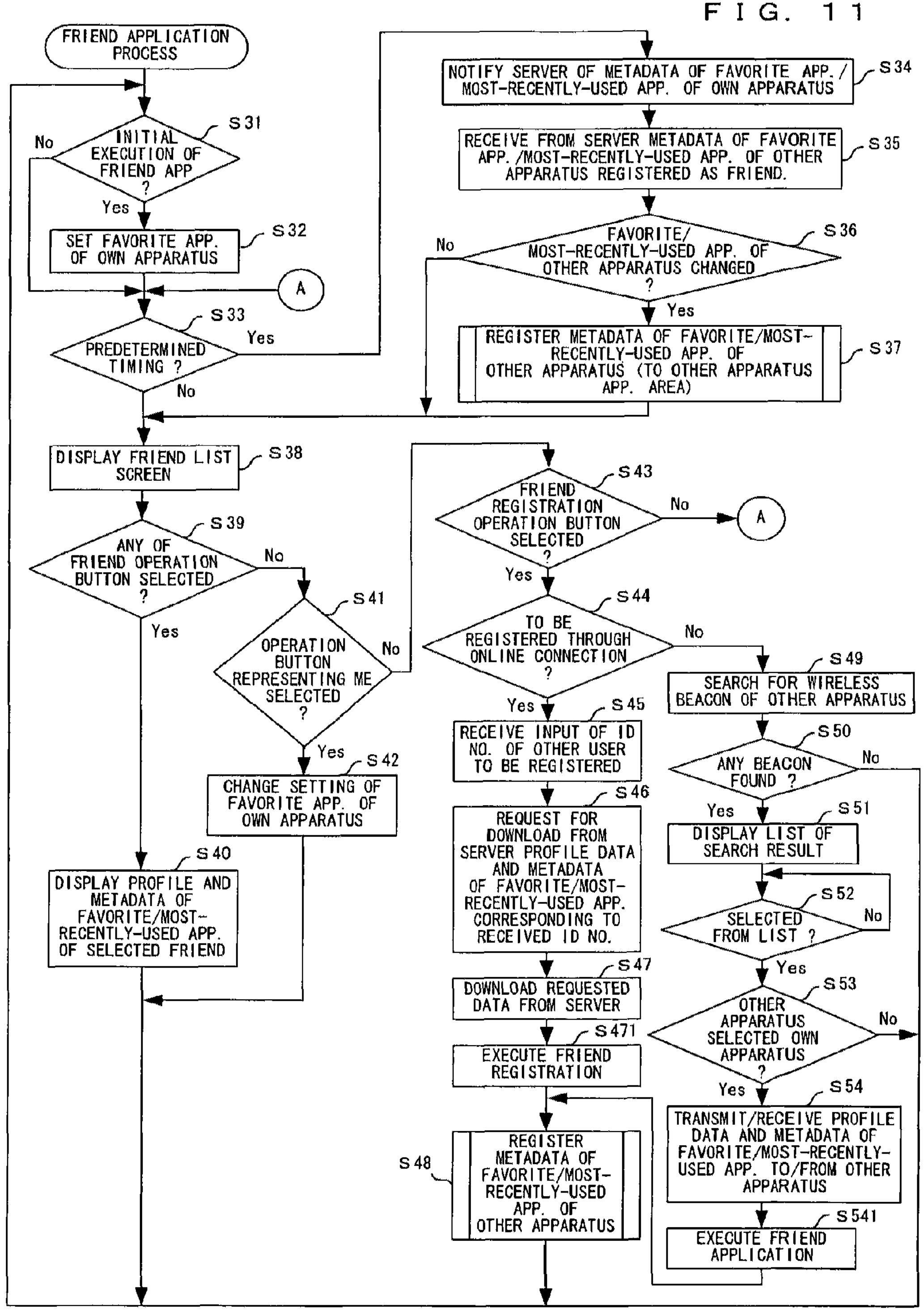
FIG. 11 is a flowchart showing an example of a friend application process.

The favorite application data 400 is data (typically, application ID data) representing a user's favorite application which is set in a friend application process to be described later with reference to FIG. 11.

As illustrated in FIG. 7(1), the passing box data 500 includes application ID data 102*c*, transmission box data 500*a*, and reception box data 500*b*, which are arranged as a set for each application that is executable on the game apparatus 1 (in the present embodiment, applications stored in the application storage area 100 and applications stored in a cartridge 29 mounted to the game apparatus 1). The transmission box data 500*a* is transmission information to be transmitted to another game apparatus 1 through the passing communication process shown in FIG. 20. The reception box data 500*b* is reception information to be received from another game apparatus 1 through the passing communication process shown in FIG. 20. The transmission information and reception information are set for each application.

Hereinafter, the passing box data of a passing application to be described later with reference to FIG. 21 will be described. As illustrated in FIG. 7 (2), the passing box data of the passing application includes: ID data 102*c* of the passing application; the transmission box data 500*a* which is composed of the metadata 501 of a favorite application of the own apparatus (own game apparatus 1) and the metadata 502 of a most-recently-used application of the own apparatus; and the reception box data 500*b* which is composed of the metadata 503 of a favorite application of another apparatus (another game apparatus 1) and the metadata 504 of a most-recently-used application of another apparatus. The metadata 501 of the favorite application of the own apparatus is the metadata (102) of the favorite application which is favored by the user of the own apparatus, and which is represented by the favorite application data 400 of the own apparatus. The metadata 502 of the most-recently-used application of the own apparatus is the metadata (102) of an application which is most recently used or currently being used by the own apparatus and which is represented by the most-recently-used app data 300 of the own apparatus. The metadata 503 of favorite applications of another apparatus is the metadata (102) of the favorite application which is favored by a user of the other apparatus and which is represented by the favorite application data 400 of the other apparatus. The metadata 504 of the most-recently-used applications of another apparatus is the metadata (102) of an application which is most recently used or currently being used by the other apparatus and which is represented by the most-recently-used app data 300 of the other apparatus.

The friend list data 600 is friend code list data representing another game apparatus 1 (friend), which has been registered by the user as a friend in the friend application process to be described later with reference to FIG. 11.

The graph target period data 700 is data representing a period set for the application play history to be displayed as a graph in the play history application process to be described later with reference to FIG. 14.

The ranking condition data 800 is data defining ranking conditions for application ranking in the play history application process to be described later with reference to FIG. 14. The ranking conditions are, for example, applications which have been played the highest number of times, applications which have been played for the longest period of time, applications which have been played for the longest time on average per play, and the like.

[Main Process]

Next, with reference to FIG. 8 and FIG. 10, the processing executed by the CPU 31 based on the main process program 80 will be described. FIG. 8 is a flowchart showing an example of the main process. Except the case where an application is executed in step S12, the processes shown in the flowchart of FIG. 8 are repeated at predetermined time intervals, and thereby the main process proceeds. In addition, in all the drawings to be referred to hereinafter, the steps executed by the CPU 31 is abbreviated by "S". In addition, in the description hereinafter, there will be a case where the step S is simply abbreviated by "S".

Figure 9:
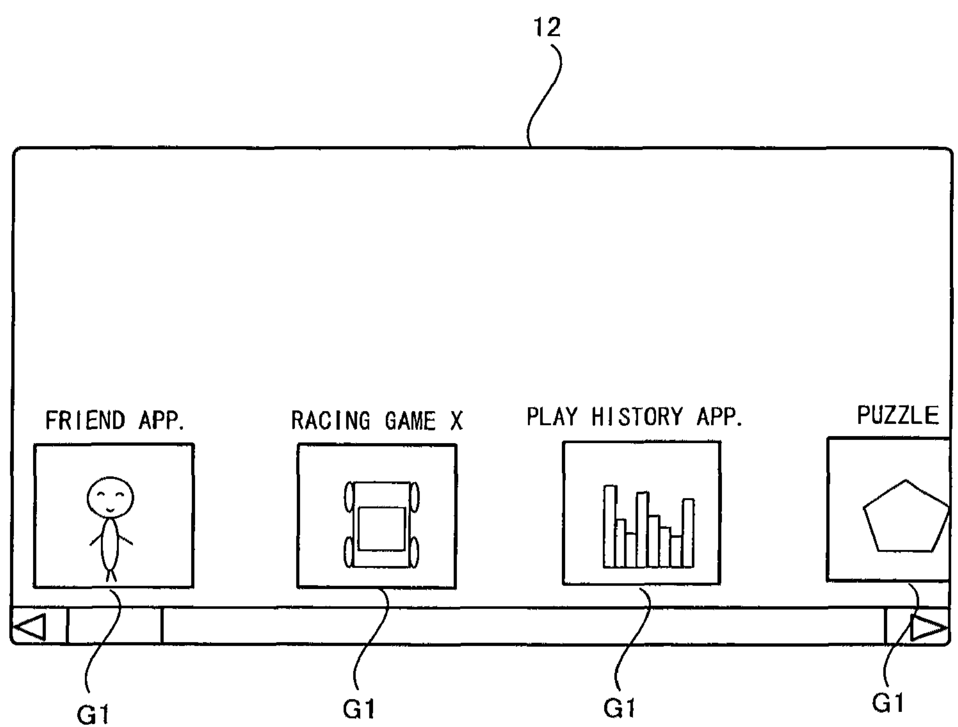
FIG. 9 is a diagram illustrating an example of a menu screen displayed on the game apparatus 1.

To begin with, when the power supply of the game apparatus 1 is turned on and execution of the main process program 80 starts, the CPU 31 causes a menu screen to be displayed on the lower LCD 12 in step S1 of FIG. 8. FIG. 9 is a diagram illustrating an example of the menu screen displayed on the game apparatus 1. As illustrated in FIG. 9, in the menu screen, icons G1 of application executable on the game apparatus 1 are displayed. Here, the executable applications includes built-in applications and DL applications which are stored in the saved data memory 34, and card applications which are stored in the cartridge 29 being accommodated (mounted) in the game apparatus 1. The user touches once any of the icons G1 displayed in the menu screen with a stylus pen 27 to select an application, and touches the same icon again to execute the selected application on the game apparatus 1. In FIG. 9, although only four icons G1 are displayed on the lower LCD 12, the user can display other icons G1 on the lower LCD 12 by scrolling the screen to the left or right. Thereafter, the processing proceeds to step S2.

In step S2, the CPU 31 determines whether the cartridge 29 is inserted (mounted) to the game apparatus 1. Specifically, the CPU 31 determines whether the cartridge 29 is connected to the cartridge I/F 43. If the determination in step S2 is YES, the processing proceeds to step S4, whereas if the determination is NO, the processing proceeds to step S6.

In step S4, the CPU 31 performs a metadata registration process for registering metadata to the own apparatus application area 201 in the metadata database 200 (see FIG. 6(2)). In the metadata registration process in step S4, metadata of a card application stored in the cartridge 29 is to be registered to the metadata database 200 (hereinafter referred to as registration target metadata). Thereafter, the processing proceeds to step S5.

Figure 10:
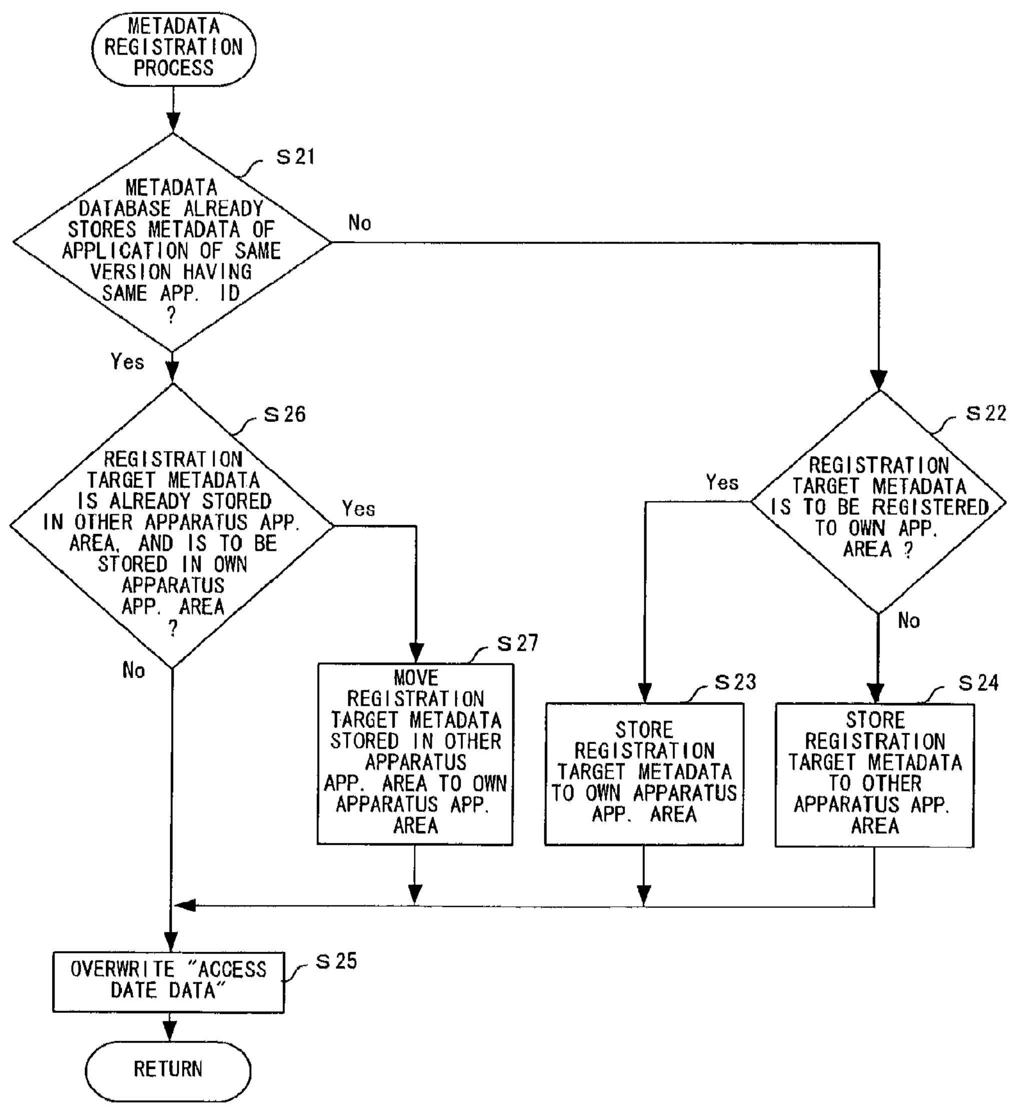
FIG. 10 is a diagram illustrating an example of a metadata registration process.

FIG. 10 is a diagram showing an example of the metadata registration process. Hereinafter, with reference to FIG. 10, the metadata registration process will be described.

To begin with, in step S21 of FIG. 10, the CPU 31 determines whether the metadata database 200 already stores therein metadata of an application which has the same application ID and the same version as an application to be registered. For determination, the CPU 31 refers to the application ID data 102*c* and application version data 102*d* of each piece of metadata 102 stored in the metadata database 200. If the determination in step S21 is YES, the processing proceeds to step S26, whereas if the determination is NO, the processing proceeds to step S22.

In step S22, the CPU 31 determines whether the registration target metadata determined in step S21 is to be registered to the own apparatus application area 201 of the metadata database 200. Specifically, if the registration target metadata is the metadata of an application stored in the application storage area 101 of the saved data memory 34, or the metadata of an application stored in a cartridge 29 mounted to the game apparatus 1 (i.e., metadata of a built-in application in the own apparatus, a DL application of the own apparatus, and a card application mounted to the own apparatus), the CPU 31 determines that the registration target metadata is to be registered to the own apparatus application area 201 in the metadata database 200. If not, i.e., if the registration target metadata is the metadata received from another game apparatus 1 or the like, the CPU 31 determines that the registration target metadata is to be registered to the other apparatus application area 202 of the metadata database 200. If the determination in step S22 is YES, the processing proceeds to step S23, whereas if the determination is NO, the processing proceeds to step S24.

In step S23, the CPU 31 stores the registration target metadata into the own apparatus application area 201 of the metadata database 200. Thereafter, the processing proceeds to step S25.

In step S24, the CPU 31 stores the registration target metadata into the other apparatus application area 202 of the metadata database 200. Thereafter, the processing proceeds to step S25.

In step S25, the CPU 31 updates the access date data 102*j* (see FIG. 6(1)) stored in the saved data memory 34. Thereafter, the metadata registration process ends, and the processing returns to the main process in FIG. 8. Although details of the processing will be omitted, if the storage capacity of the metadata database 200 has been exhausted, or if the number of metadata stored therein has reached the maximum storage number, the CPU 31 deletes oldest pieces of metadata based on the access date data.

In step S26, the CPU 31 determines whether the registration target metadata is already stored in the other apparatus application area 202, and is to be registered to the own apparatus application area 201. Here, the CPU 31 determines whether the registration target metadata is to be registered to the own apparatus application area 201 using the similar determination method to that in step S22. If the determination in step S26 is YES, the processing proceeds to step S27, whereas if the determination is NO, the processing proceeds to step S25.

In step S27, the CPU 31 moves the registration target metadata already stored in the other apparatus application area 202 to the own apparatus application area 201. The own apparatus application area which stores metadata of applications held by the own apparatus is superordinate to the other apparatus application area which stores metadata received from other apparatuses, and thus if registration target metadata is already stored in the other apparatus application area, the registration target metadata is to be moved to the superordinate own apparatus application area in this process. Thereafter, the processing proceeds to step S25.

In the metadata registration process in step S4 of FIG. 8, the metadata of the application stored in the cartridge 29 mounted to the game apparatus 1 (i.e., an own apparatus application) is the registration target metadata. Thus, if the registration target metadata is not registered to the own apparatus application area 201 or the other apparatus application area 202, the registration target metadata is to be registered to the own apparatus application area 201 (S23). Meanwhile, if the registration target metadata is not registered in the own apparatus application area 201, but registered in the other apparatus application area 202, then the registration target metadata is registered to the own apparatus application area 201 after being moved from the other apparatus application area 202 (S27). On the other hand, if the registration target metadata is already registered to the own apparatus application area 201, the registration target metadata will not be registered to the metadata database 200 (NO in S26).

In step S5, the CPU 31 additionally displays on a menu screen (see FIG. 9), which is displayed in step S1, an icon unique to the card application stored in the cartridge 29 which is determined to have been inserted in the game apparatus 1 in step S2. Thereafter, the processing proceeds to step S6.

In step S6, the CPU 31 determines whether the user has performed an operation to give an instruction for executing any of the icons for built-in applications displayed in the menu screen. If the determination in step S6 is YES, the processing proceeds to step S7, whereas if the determination is NO, the processing proceeds to step S14.

In step S7, the CPU 31 performs metadata registration process in FIG. 10. In the metadata registration process in step S7, the metadata of a built-in application that is determined to have been given an instruction for execution in step S6 (i.e., the own apparatus application) is the registration target metadata. Accordingly, the registration target metadata is to be registered to the own apparatus application area 201 when it is the same as that registration target metadata in step S4 (S23, S27). Thereafter, the processing proceeds to step S8.

In step S8, the CPU 31 stores a current time and date in the play start time data 251*a* of play data 251 corresponding to the application that is determined to have been given an instruction for execution in step S6, S14, or S19 (own apparatus application) (see FIG. 6(3)). Thereafter, the processing proceeds to step S9. If a process in step S8 is to be executed subsequently to steps S6 and S7, in step S8, the CPU 31 stores a current time and date in the play start time data 251*a* of play data 251 corresponding to the built-in application that is determined to have been given an instruction for execution in step S6. Further, if the process in step S8 is to be executed subsequently to steps S14, S15, and S20 to be described later, then in step S8, the CPU 31 stores a current time and date in the play start time data 251*a* of play data 251 corresponding to the DL application that is determined to have been given an instruction for execution in step S14. Further, if the process in step S8 is to be executed subsequently to steps S19 and S20 to be described later, then in step S8, the CPU 31 stores a current time and date in the play start time data 251*a* in play data 251 corresponding to the card application that is determined to have been given an instruction for execution in step S19.

In step S9, the CPU 31 stores an application ID of the application (own apparatus application) that is determined to have been selected in step S6, S14, or S19 in the most-recently-used app data 300 of the saved data memory 34. Thereafter, the processing proceeds to step S10. If the process in step 9 is to be executed subsequently to steps S6, S7, and S8, the CPU 31 stores, in step S9, the application ID of the built-in application that is determined to have been given an instruction for execution in step S6 in the most-recently-used app data 300. Further, if the process in step 9 is to be executed subsequently to steps S14, S15, S20 which are to be described later, and S8, the CPU 31 stores, in step S9, the application ID of the DL application that is determined to have been given an instruction for execution in step S14 in the most-recently-used app data 300. Further, if the process in step 9 is to be executed subsequently to steps S19, S20, which are to be described later, and S8, the CPU 31 stores, in step S9, the application ID of the card application that is determined to have been given an instruction for execution in step S19 in most-recently-used app data 300.

In step S10, the CPU 31 stores the metadata of the most-recently-used application of the own apparatus and the metadata of the favorite application of the own apparatus into the passing transmission box data 500*a* of the passing application (see FIG. 7(2)). More specifically, the CPU 31 refers to metadata 102 of the metadata database 200 (see FIG. 6(1)), and stores metadata corresponding to the most-recently-used app data (ID data) 300 of the own apparatus, and metadata corresponding to the favorite application data (ID data) 400 of the own apparatus, which are in the saved data memory 34, into the passing transmission box data 500*a* of the passing application. Thereafter, the processing proceeds to step S11.

In step S11, the CPU 31 activates an application (own apparatus application) that is determined to have been given an instruction for execution in step S6, S14, or S19. If the process in step 11 is to be executed subsequently to steps S6 to S10, then the CPU 31 activates, in step S11, the built-in application that is determined to have been given an instruction for execution in step S6. Further, if the process in step 11 is to be executed subsequently to steps S14, S15, S20 which are to be described later, and S8 to S10, the CPU 31 activates, in step S11, the DL application that is determined to have been given an instruction for execution in step S14. Further, if the process in step 11 is to be executed subsequently to steps S19, S20, which are to be described later, and S8 to S10, the CPU 31 activates, in step S11, the card application that is determined to have been given an instruction for execution in step S19. Thereafter, the processing proceeds to step S12.

In step S12, the CPU 31 executes processing the application (own apparatus application) activated in step S11. The application to be executed in step S12 includes various applications such as a versus game, a racing game, a sport game, and a friend application which is to be described later (see FIG. 11). Thereafter, the processing proceeds to step S13.

In step S13, the CPU 31 stores a current time and date as the play end time in the play end time data 251*b* (FIG. 6(3)) of the play history database 250 corresponding to the application (own apparatus application) which has been executed and ended in step S12. Thereafter, the processing returns to step S1.

On the other hand, in step S14, the CPU 31 determines whether the user has performed an operation to given an instruction for executing any of the icons for DL applications displayed in the menu screen. If the determination in step S14 is YES, the processing proceeds to step S15, whereas if the determination is NO, the processing proceeds to step S19.

In step S15, the CPU 31 refers to the present flag data 103 (see FIG. 5) and determines whether the icon of the DL application that is determined to have been given an instruction for execution in step S14 is in a present icon display mode. Specifically, if the present flag represented by the present flag data 103 is set ON, the CPU 31 determines that the DL application that is determined to have been given an instruction for execution in step S14 is displayed with a present icon, whereas if the flag is set OFF, the CPU 31 determines that the DL application is displayed with an icon unique to the application. If the determination in step S15 is YES, the processing proceeds to step S16, whereas if the determination is NO, the processing proceeds to step S20.

In step S16, the CPU 31 executes the metadata registration process shown in FIG. 10. In the metadata registration process in step S16, the metadata of the DL application (own apparatus application) that is determined to have been given an instruction for execution in step S14 is the registration target metadata. Accordingly, the registration target metadata is registered to the own apparatus application area 201 when it is the same as the registration target metadata in step S4 (S23, S27). Thereafter, the processing proceeds to step S17.

In step S17, the CPU 31 switches the display mode of the icon of the DL application that is determined to have been given an instruction for execution in step S14 from the present icon display mode to the icon display mode unique to the DL application. Thereafter, the processing proceeds to step S18.

In step S18, the CPU 31 switches the present flag, represented by the present flag data 103, OFF from ON. Accordingly, the icon of the DL application is switched from the present icon display mode to icon display mode unique to the application. Thereafter, the processing returns to step S1.

In step S20, the CPU 31 updates the access date data 102*j* (see FIG. 6(1)) stored in the saved data memory 34, similarly to the process in step S25 shown in FIG. 10. Thereafter, the processing proceeds to step S8.

On the other hand, in step S19, the CPU 31 determines whether the user has performed an operation to give an instruction for executing any of the icons for card applications displayed in the menu screen. If the determination in step S19 is YES, the processing proceeds to step S20, whereas if the determination is NO, the processing returns to step S1.

As described above, when a cartridge 29 is initially accommodated in the game apparatus 1 through the main process, the metadata of an application stored in the cartridge 29 is registered to the own apparatus application area 201 of the metadata database 200 (S4). In addition, when a built-in application is initially executed through the main process, the metadata of the built-in application is registered to the own apparatus application area 201 of the metadata database 200 (S7). In addition, when the present icon of a DL application is switched to the icon unique to the DL application through the main process upon operation of the user, the metadata of the DL application is registered to the own apparatus application area 201 of the metadata database 200 (S16).

[Friend Application Process]

Next, the description will be made on a friend application process which is realized when a friend application, which is an example of applications stored in the application storage area 100 of the saved data memory 34, is executed by the CPU 31. FIG. 11 is a flowchart showing an example of the friend application process. The friend application process is an example of application processes executed in step S12 in the main process shown in FIG. 8.

To begin with, in step S31, the CPU 31 determines whether this is the initial execution of the friend application. If the determination in step S31 is YES, the processing proceeds to step S32, whereas if the determination is NO, the processing proceeds to step S33.

In step S32, the CPU 31 sets a favorite application of the own apparatus. Specifically, the CPU 31 displays, on the lower LCD 12, a screen for selecting a favorite application, and sets the favorite application of the own apparatus based on the user's selection operation. More specifically, the initial value of the favorite application data 400 (see FIG. 5) is NULL, and the CPU 31 stores, based on the user's selection operation, application ID data of the favorite application of the own apparatus as the favorite application data 400. Thereafter, the processing proceeds to step S33.

In step S33, the CPU 31 determines whether a predetermined timing has come. Here, the predetermined timing arrives at predetermined time intervals. If the determination in step S33 is YES, the processing proceeds to step S34, whereas if the determination is NO, the processing proceeds to step S38.

In step S34, the CPU 31 notifies the server 4 via the network 3 of the metadata of the favorite application and metadata of the most-recently-used application of the own apparatus together with the friend code representing the own apparatus (see FIG. 3). Accordingly, the CPU 31 notifies the server 4 that the own apparatus is online with the server 4. Thereafter, the processing proceeds to step S35.

In step S35, the CPU 31 receives from the server 4 via the network 3 the metadata of a favorite application and the metadata of a most-recently-used application of another apparatus registered as a friend, together with the friend code of the other apparatus. Thereafter, the processing proceeds to step S36.

In step S36, the CPU 31 determines whether the metadata having been received from the other apparatus (another game apparatus 1) in step S35 is changed. The determination is performed, based on the friend code of the other apparatus included in the friend list data 600, by comparing the metadata of the other apparatus in the metadata database 200, which is associated with the friend code, to the metadata of the other apparatus received in step S35. If the determination in step S36 is YES, the processing proceeds to step S37, whereas if the determination is NO, the processing proceeds to step S38.

In step S37, the CPU 31 executes the metadata registration process in FIG. 10. Here, in the metadata registration process in step S37, the metadata of the other apparatus, which is determined to have been changed in step S36, is the registration target metadata. Accordingly, if the registration target metadata is not registered in the own apparatus application area 201 or the other apparatus application area 202, then the registration target metadata is to be registered to the other apparatus application area 202 (S24). Meanwhile, if the registration target metadata is registered in the own apparatus application area 201 or the other apparatus application area 202, the registration target metadata will not be registered to the metadata database 200 (NO in S26). Thereafter, the processing proceeds to step S38.

Through execution of processes in steps S33 to S37, the metadata of the latest favorite application and the metadata of the most-recently-used applications of the other apparatus registered as a friend can be registered to the metadata database 200.

Figure 12:
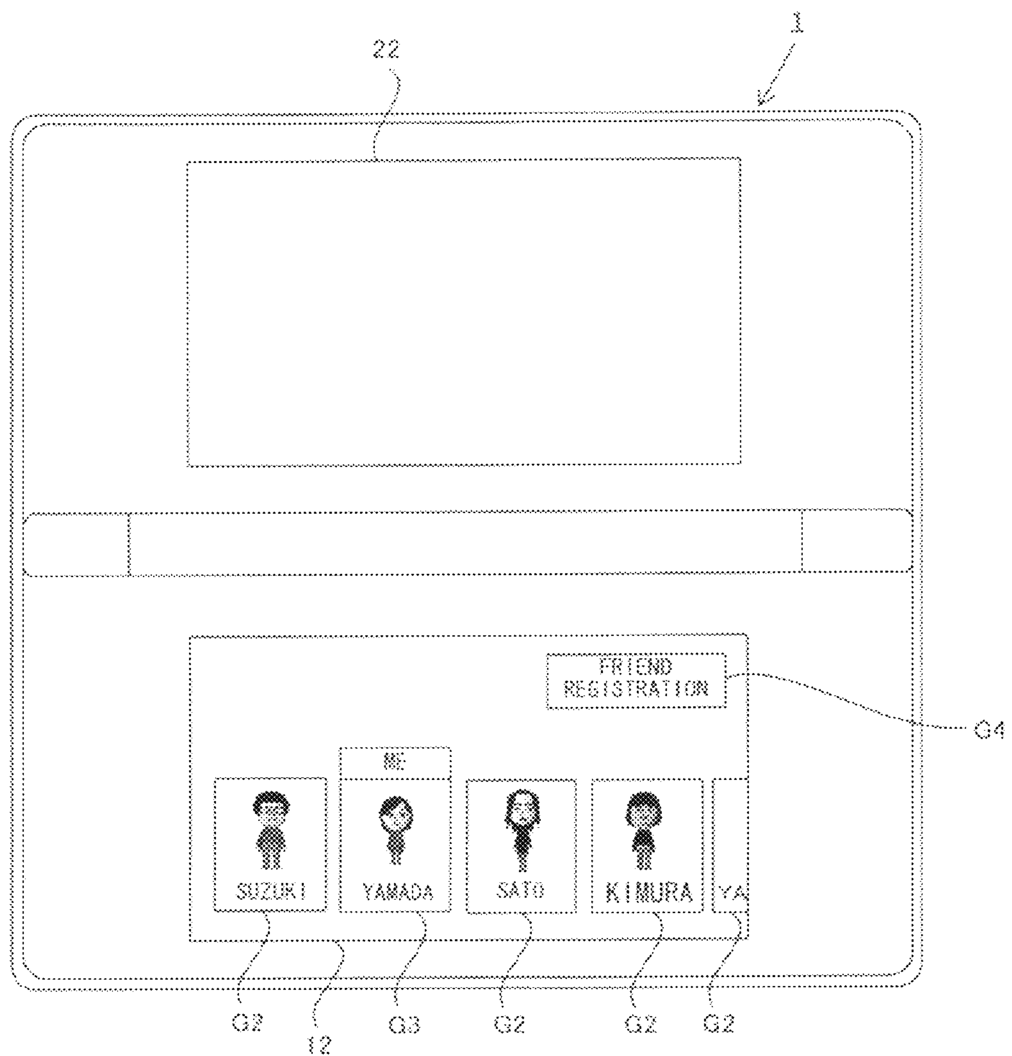
FIG. 12 is a diagram illustrating an example of a friend list screen displayed on a lower LCD 12.

In step S38, the CPU 31 displays on the lower LCD 12 a friend list screen. FIG. 12 is a diagram illustrating an example of the friend list screen displayed on the lower LCD 12. As illustrated in FIG. 12, in the friend list screen, operation buttons G2 representing friends registered as the friends (other game apparatuses 1 or the users thereof), an operation button G3 representing the user (the own game apparatus 1 or the user thereof), and an operation button G4 for allowing new friend registration. Thereafter, the processing proceeds to step S39.

In step S39, the CPU 31 determines whether the user has selected any of the operation buttons G2 representing friends displayed in the friend list screen. If the determination in step S39 is YES, the processing proceeds to step S40, whereas if the determination is NO, the processing proceeds to step S41.

Figure 13:
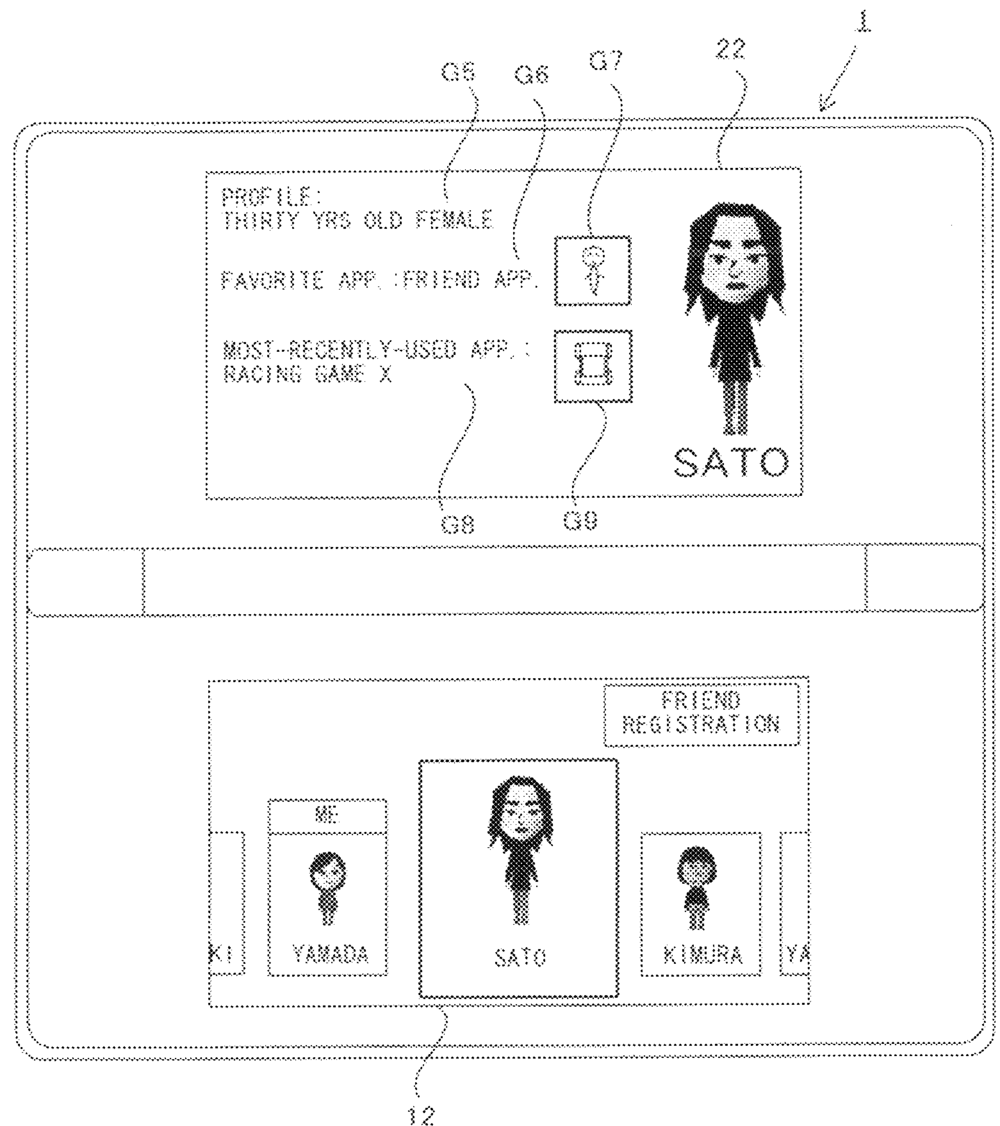
FIG. 13 is a diagram illustrating examples of a friend profile, metadata of a favorite application, and metadata of a most-recently-used application, which are displayed on an upper LCD 22.

In step S40, the CPU 31 displays on the upper LCD 22 a profile of a friend represented by the friend operation button G2 selected in step S39, the metadata of a favorite application, and the metadata of a most-recently-used application. FIG. 13 is a diagram illustrating an example of the profile of the friend, the metadata of the favorite application, and the metadata of the most-recently-used application, which are displayed on the upper LCD 22. In FIG. 13, the friend operation button G2 selected in step S39 is highlighted in lower LCD 12, and the profile G5 of the friend represented by the friend operation button G2, the metadata (title G6 and icon G7) of the friend application, which is the favorite application, and the metadata (title G8 and icon G9) of a racing game X, which is the most-recently-used application are displayed on the upper LCD 22. Thereafter, the processing returns to step S31.

In step S41, the CPU 31 determines whether the user has selected the operation button G3 representing the user him/herself displayed in the friend list screen. If the determination in step S41 is YES, the processing proceeds to step S42, whereas if the determination is NO, the processing proceeds to step S43.

In step S42, the CPU 31 changes the setting of the favorite application of the own apparatus. Specifically, the CPU 31 displays on the lower LCD 12 a screen for selecting a favorite application, and changes, based on the user's selection operation, the setting of the favorite application of the own apparatus. More specifically, the CPU 31 stores, based on the user's selection operation, the application ID data of a new favorite application of the own apparatus as the favorite application data 400 (see FIG. 5). Thereafter, the processing returns to step S31.

In step S43, the CPU 31 determines whether the user has selected the operation button G4 for allowing new registration of friends displayed in the friend list screen. If the determination in step S41 is YES, the processing proceeds to step S44, whereas if the determination is NO, the processing returns to step S33.

In step S44, the CPU 31 determines whether the new friend registration is based on the method using online connection via the network 3. If the determination in step S44 is YES, the processing proceeds to step S45, whereas if the determination is NO, the processing proceeds to step S49.

In step S45, the CPU 31 receives an input of an identification number (friend code) of another user to be registered by the user. Specifically, the CPU 31 displays on the lower LCD 12 a screen for allowing the user to input the identification number of the other user, and upon input operation by the user, the CPU 31 receives an input of the identification number of the other user to be registered by the user. Thereafter, the processing proceeds to step S46.

In step S46, the CPU 31 requests server 4 for downloading profile data, the metadata of the favorite application, and the metadata of the most-recently-used application of the other user corresponding to the identification number having received in step S45, through online connection via the network 3 (typically, Internet connection using the wireless communication module 37). Thereafter, the processing proceeds to step S47. In accordance with the download request in step S46, the server 4 transmits the above-described pieces of data to the game apparatus 1 which has made the download request.

In step S47, the CPU 31 downloads, from the server 4 through the online connection, the data whose download request has been made in step S46. Thereafter, the processing proceeds to step S471.

In step S471, the CPU 31 executes the friend registration in relation to the identification number whose input has been received in step S45. Specifically, CPU 31 registers to the friend list data 600 the identification number of the other user whose input has been received in step S45. In that case, the CPU 31 stores in the saved data memory 34 the profile of the friend user (friend) having been downloaded in step S47 while being associated with the registered identification number. Thereafter, the processing proceeds to step S48.

In step S48, the CPU 31 executes the metadata registration process in FIG. 10. Here, in the metadata registration process in step S48 subsequent to step S471, the metadata of the favorite application and most-recently-used application of another apparatus having been downloaded in step S47 is the registration target metadata. Accordingly, if the registration target metadata is not registered in the own apparatus application area 201 or the other apparatus application area 202, the registration target metadata is to be registered to the other apparatus application area 202 (S24). Meanwhile, if the registration target metadata is registered in the own apparatus application area 201 or in the other apparatus application area 202, the registration target metadata will not be registered to the metadata database 200 (NO in S26). Thereafter, the processing returns to step S31.

In step S49, the CPU 31 transmits radio beacons and also searches for radio beacons transmitted from another game apparatus 1 for performing short distance wireless communication with such another game apparatus 1 using the wireless communication module 37 (typically, performing wireless communication using weak radio waves which do not require radio station licenses). Here, the radio beacons include the identification number (friend code) of a game apparatus 1 that is the radio beacon source. Thereafter, the processing proceeds to step S50.

In step S50, the CPU 31 determines whether any radio beacons transmitted from another game apparatus 1 has been identified (received). If the determination in step S50 is YES, the processing proceeds to step S51, whereas if the determination is NO, the processing returns to step S31.

In step S51, the CPU 31 displays on the lower LCD 12 a list of other game apparatuses 1 that can be the radio beacon sources. Here, elements constituting the list (e.g., images representing other game apparatuses 1 as the radio beacon sources) are respectively associated with the identification numbers of the other game apparatuses 1 as the radio beacon sources included in the radio beacons having been received in step S50. Thereafter, the processing proceeds to step S52.

In step S52, the CPU 31 waits until any of the other game apparatuses 1 is selected from the list displayed in step S51, and upon selection, the processing proceeds to step S53. In that case, the CPU 31 transmits to the selected other game apparatus 1 a selection signal which notifies of the game apparatus 1 of its selection.

In step S53, the CPU 31 determines whether the other game apparatus 1 (counterpart apparatus) having been selected in step S52 has selected the own game apparatus 1. This determination is made depending on the presence or absence of the selection signal from the other game apparatus 1 (counterpart apparatus). If the determination in step S53 is YES, the processing proceeds to step S54, whereas if the determination is NO, the processing returns to step S31.

In step S54, the CPU 31 transmits to and receives from the counterpart apparatus the profile data, the metadata of the favorite application, and the metadata of the most-recently-used application through the short distance wireless communication using the wireless communication module 37. Thereafter, the processing proceeds to step S541.

In step S541, the CPU 31 executes friend registration in relation to the identification number of the other game apparatus 1 that is determined to have been selected in step S52. Specifically, the CPU 31 registers the identification number of the other game apparatus 1 that is determined to have been selected in step S52 to the friend list data 600. In that case, the CPU 31 stores the profile of the counterpart user (friend) having been downloaded in step S54 in the saved data memory 34 while associating the profile with the registered identification number. Thereafter, the processing proceeds to step S48.

In step S48, the CPU 31 executes the metadata registration process in FIG. 10. Here, in the metadata registration process in step S48 subsequent to step S541, the metadata of the other apparatus (counterpart apparatus) received in step S54 is the registration target metadata. Accordingly, if the registration target metadata is not registered in the own apparatus application area 201 or the other apparatus application area 202, the registration target metadata is to be registered to the other apparatus application area 202 (S24). Meanwhile, if the registration target metadata is registered in the own apparatus application area 201 or in the other apparatus application area 202, the registration target metadata will not be registered to the metadata database 200 (NO in S26). Thereafter, the processing proceeds to step S31.

As described above, in the friend application process, the metadata of the favorite application and that of the most-recently-used application of the other game apparatus 1 registered as the friend are received (S37, S48) and thereby displayed (S40).

[Play History Application Process]

Next, description will be made on the play history application process which is realized by the CPU 31 executing the play history application, which is an example of applications stored in the application storage area 100 of the saved data memory 34. FIG. 14 is a flowchart showing an example of the play history application process. The play history application process is an example of the application processes executed in step S12 in the main process in FIG. 8.

To begin with, in step S61, the CPU 31 displays on the lower LCD 12 the menu screen of the play history application. In the menu screen of the play history application, the operation button of the "play history" and the operation button of the "application picture book" are included. Thereafter, the processing proceeds to step S62.

In step S62, the CPU 31 determines whether an operation of selecting the operation button of the play history in the menu screen of the play history application has been performed by the user. If the determination in step S62 is YES, the processing proceeds to step S63, whereas if the determination is NO, the processing proceeds to step S70.

In step S63, the CPU 31 refers to the graph target period data 700 (see FIG. 5), and specifies a graph target period. The initial value of the graph target period represented by the graph target period data 700 is, for example, a current one day. Thereafter, the processing proceeds to step S64.

In step S64, the CPU 31 displays on the upper LCD 22 a graph of the play history of all applications having been played during the graph target period specified in step S63, by using the play history database 250 (see FIG. 6(3)). Thereafter, the processing proceeds to step S65.

In step S65, the CPU 31 calculates a total play time of each application having been played during the graph target period, by using the play history database 250. Thereafter, the processing proceeds to step S66.

In step S66, the CPU 31 displays on the upper LCD 22 the metadata (typically, the icon and name) of an application that was played for the longest time in the graph target period, based on the total play time of each application calculated in step S65. Thereafter, the processing proceeds to step S67.

Figure 15:
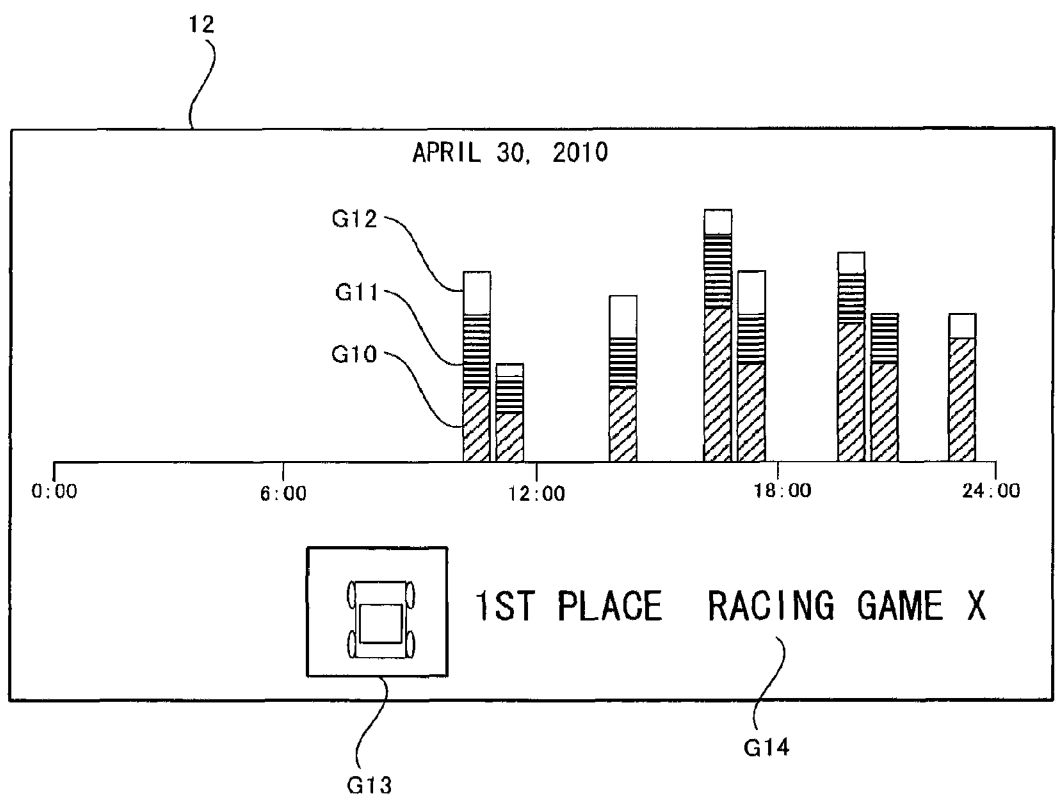
FIG. 15 is a diagram illustrating an example of a graph showing the play history of all applications having been played during a graph target period, and an example of metadata of an application that had been played for the longest period of time during the graph target period, which are both displayed on the lower LCD 12 through processes in steps S63 to S66 in FIG. 14.

FIG. 15 is a diagram showing an example of a graph of the play history of all applications having been played during the graph target period, and an example of metadata of the application that was played for the longest time in the graph target period, which are displayed on the upper LCD 22 through the processes in steps S63 to S66. In FIG. 15, the graph target period is one day of Apr. 30, 2010. As shown in FIG. 15, three applications were played during the day, and the play time of each application was represented with the length (magnitude) of G10, G11, and G12 constituting the rectangular graphs. In FIG. 15, the application corresponding to G10 was played for the longest time. In addition, in FIG. 15, the icon G13 and the name G14 of the racing game X, which are the metadata of the application having been played for the longest time, are displayed.

In step S67, the CPU 31 determines whether an operation of giving an instruction (an operation has been performed) for changing the graph target period has been performed by the user. If the determination in step S67 is YES, the processing proceeds to step S69, whereas if the determination is NO, the processing proceeds to step S68.

In step S69, the CPU 31 changes the graph target period data 700 to data representing a graph target period that has been changed upon reception of the instruction in step S67. Thereafter, the processing returns to step S63, and a new graph or the like, which is based on the changed graph target period, is displayed.

In step S68, the CPU 31 determines whether an operation of giving an instruction for terminating the play history display has been performed by the user. If the determination in step S68 is YES, the play history application process ends, and the processing proceeds to step S13 in the main process in FIG. 8, whereas if the determination is NO, the processing returns to step S64, and thereby the graph or the like is continuously displayed.

In step S70, the CPU 31 determines whether an operation of selecting the operation button of the application picture book in the play history application menu screen has been performed by the user. If the determination in step S70 is YES, the processing proceeds to step S71, whereas if the determination is NO, the processing proceeds to step S61, and thereby the menu screen of the play history application is continuously displayed.

Figure 16:
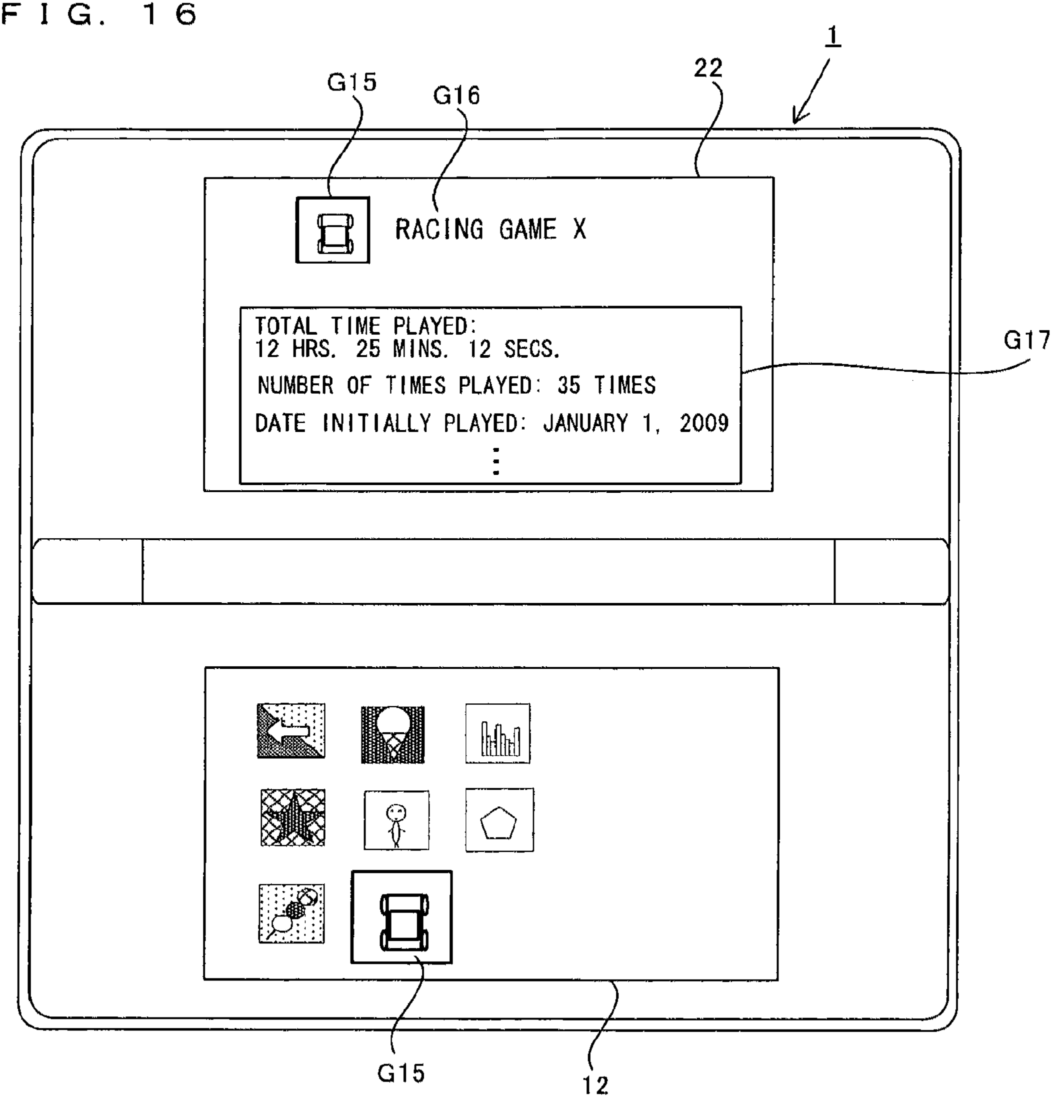
FIG. 16 illustrates an example of metadata of an application that is determined to have been selected in step S72 in FIG. 14, represented by an icon, and an example of display of the play history of the application.

In step S71, as illustrated in FIG. 16, the CPU 31 displays on the lower LCD 12 a list of icons (metadata) of all the applications stored in the application storage area 100 of the saved data memory 34. Thereafter, the processing proceeds to step S72.

In step S72, the CPU 31 determines whether an operation of selecting any of the icons displayed in step S71 has been performed by the user. If the determination in step S72 is YES, the processing proceeds to step S73, whereas if the determination is NO, the processing proceeds to step S75.

In step S73, as illustrated in FIG. 16, the CPU 31 displays on the upper LCD 22 the metadata (also including other metadata than icons) of the application represented by the icon that is determined to have been selected in step S72, and the play history of the application. In FIG. 16, an icon G15 which is determined to have been selected by the user in step S72 is highlighted in lower LCD 12, and in the upper LCD 22, the icon G15, an application name G16, and play history-related information G17 are displayed. The play history-related information G17 includes the play time, the number of times of play, the average play time, date initially played, date last played, and the like. Thereafter, the processing proceeds to step S74.

In step S74, the CPU 31 determines whether an operation of giving an instruction for terminating the application picture book display has been performed by the user. If the determination in step S74 is YES, the play history application process ends, and the processing proceeds to step S13 in the main process in FIG. 8, whereas if the determination is NO, the processing returns to step S71 and the list of icons or the like is continuously displayed.

In step S75, the CPU 31 determines whether selection of an operation button (not shown) on the lower LCD 12 to give an instruction for displaying the ranking of applications has been performed by the user. If the determination in step 75 is YES, the processing proceeds to step S76, whereas if the determination is NO, the processing returns to step S71, and thereby the list of icons is continuously displayed.

In step S76, the CPU 31 generates the ranking of applications based on the ranking conditions represented by the ranking condition data 800 (see FIG. 5) while using the play history database 250 (see FIG. 6(3)). Thereafter, the processing proceeds to step S77.

Figure 17:
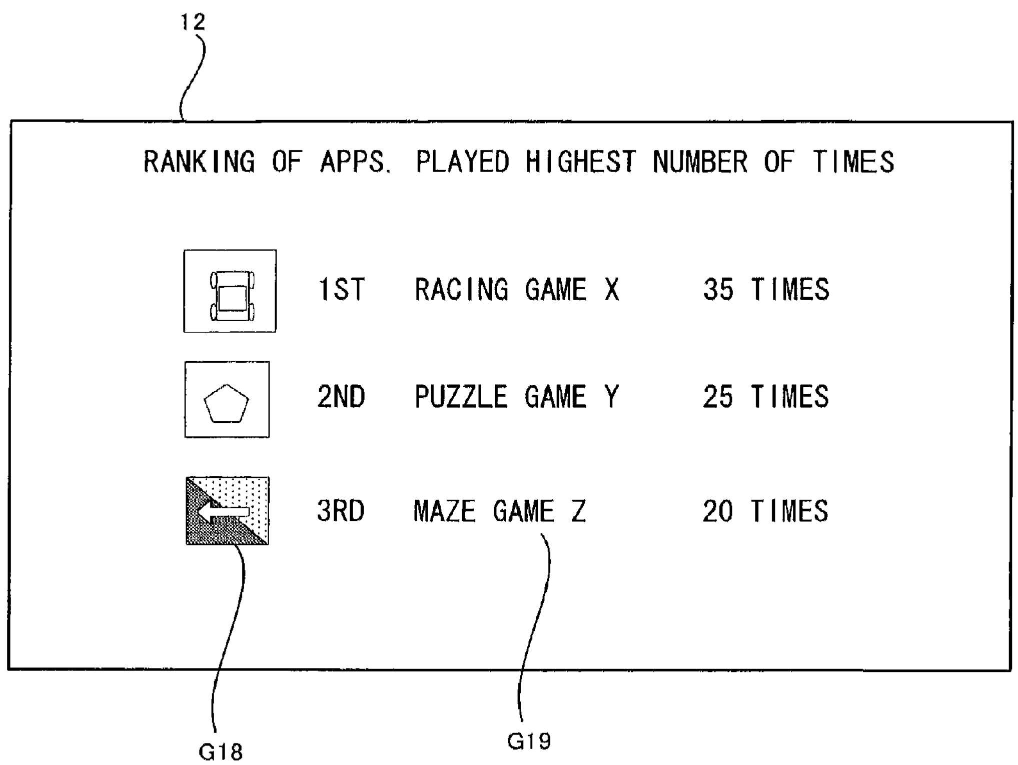
FIG. 17 illustrates an example of an image showing ranking of applications displayed through a process in step S77 in FIG. 14.

In step S77, the CPU 31 displays on the lower LCD 12 the ranking generated in step S76, by using the metadata. FIG. 17 is an example of an image showing the ranking of the applications displayed through the process in step S77. In FIG. 17, the ranking of the applications that have been played the highest number of times is displayed by using icons G18 and names G19, which are the metadata of the applications. Thereafter, the processing proceeds to step S78.

In step S78, the CPU 31 determines whether an instruction has been given by the user for changing the ranking conditions. If the determination in step S78 is YES, the processing proceeds to step S79, whereas if the determination is NO, the processing proceeds to step S80.

In step S79, the CPU 31 changes the ranking condition data 800 of the saved data memory 34 to the data representing the ranking conditions that have been changed in step S78. Thereafter, the processing returns to step S76, and thereby the ranking based on the new ranking conditions is displayed.

In step S80, the CPU 31 determines whether an instruction has been given by the user for terminating the application picture book display. If the determination in step S80 is YES, the play history application process ends, and the processing proceeds to step S13 in the main process in FIG. 8, whereas if the determination is NO, the processing returns to step S76, and thereby the ranking is continuously displayed.

As described above, with the play history application process, the list of applications, ranking of the applications, and the like can be displayed by using the metadata.

[Passing Communication Process]

Next, description will be made on the passing communication process which is realized by the CPU 31 and the wireless communication module 37 executing the passing communication program 90 stored in the saved data memory 34. If the game apparatus 1 and another game apparatus 1 both can execute an application, by respectively performing the passing communication process, transmission/reception of predetermined information defined to the application is performed between the game apparatus 1 and the other game apparatus 1.

Figure 18:
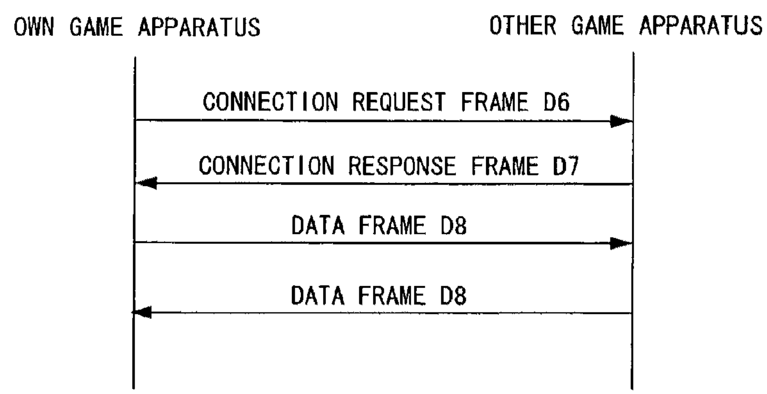
FIG. 18 is communication sequence diagram illustrating an example of a passing communication process.

FIG. 18 is a communication sequence diagram illustrating an example of the passing communication process. FIG. 18 illustrates a case where an own game apparatus 1 transmits a connection request frame to another game apparatus 1. The own game apparatus 1 broadcasts a connection request frame D6 (beacon frame) to other game apparatuses 1 within a communicable range. When any of the other game apparatuses 1 receives the connection request frame D6, it transmits a connection response frame D7 to the own game apparatus 1 that is the source of the connection request frame D6.

Upon reception of the connection response frame D7, the own game apparatus 1 transmits to the other game apparatus 1 a data frame D8 including the transmission box data 500*a* (see FIG. 7) of the own apparatus. Here, to the transmission box data 500*a*, the corresponding application ID data 102*c* (see FIG. 7(1)) is attached. For example, in the case of the passing application to be described later, the ID data of the passing application, the metadata of the favorite application of the own apparatus, and the metadata of the most-recently-used application of the own apparatus are included in the data frame D8 (see FIG. 7(2)). When the other game apparatus 1 receives the data frame D8, it returns a data frame D8 generated by itself to the own game apparatus 1. In the present embodiment, the above-described series of communication steps are performed repeatedly at predetermined time intervals. If the own game apparatus 1 is to receive the connection request frame D6, the own game apparatus 1 and the other game apparatus 1 in FIG. 18 should be replaced with each other.

Hereinafter, with reference to FIG. 19, description will be made on the frames D6 to D8 which are transmitted/received through the passing communication process. FIG. 19(1) is a diagram illustrating an example of the connection request frame D6. The connection request frame D6 includes a frame type F_TYP, a source MAC (Media Access Control) address, and an application ID list. The frame type F_TYP represents types of frames, and in this case, information representing the connection request frame D6 is described. The application ID list is a list of all pieces of the application ID data 102*c* (see FIG. 7(1)) in the passing box data 500 of the game apparatus 1 which transmits the connection request frame D6. In other words, the application ID list is a list of application IDs of all the applications that are available for the passing communication among the applications stored in the application storage area 100 of the saved data memory 34, and a card application stored in a cartridge 29 being mounted in the game apparatus 1. Still in other words, the application ID list is a list of application IDs of all the applications that are executable on the own game apparatus 1 and that are available for the passing communication.

FIG. 19(2) is a diagram illustrating an example of the connection response frame D7. The connection response frame D7 includes the frame type F_TYP, a destination MAC address, the source MAC address, and the application ID list. In the frame type F_TYP, information representing the connection response frame D7 is described. The application ID list is a list of all pieces of application ID data 102*c* (see FIG. 7(1)) in the passing box data 500 of the game apparatus 1 which transmits the connection response frame D7.

FIG. 19(3) is a diagram illustrating an example of the data frame D8. The data frame D8 includes the frame type F_TYP, the destination MAC address, the source MAC address, the application ID data, and transmission box data. In the frame type F_TYP, information representing the data frame D8 is described.

Hereinafter, with reference to FIG. 20, description will be made on the passing communication process performed by the game apparatus 1. FIG. 20 is a flowchart showing an example of the passing communication process performed by the game apparatus 1. The passing communication process is performed repeatedly at predetermined time intervals (e.g., at intervals as short as several seconds).

To begin with, in step S91, the wireless communication module 37 determines whether a MAC address after a specified time elapsed from a response time is stored in its own memory (the internal memory of the wireless communication module 37). Here, the response time is the time when the connection response frame D7 has been transmitted in step S105 to be described later, or the time when the transmission box data has been transmitted to the communication counterpart apparatus in step S96 to be described later. If the determination in step S91 is YES, the processing proceeds to step S92, whereas if the determination is NO, the processing proceeds to step S93.

In step S92, the wireless communication module 37 deletes the MAC address. Thereafter, the processing proceeds to step S93.

In step S93, the wireless communication module 37 generates and broadcasts the connection request frame D6 including the application ID list of the own apparatus (see FIG. 19(1)). Thereafter, the processing proceeds to step S94.

In step S94, the wireless communication module 37 determines whether the connection response frame D7 including the application ID list of another apparatus (see FIG. 19(2)) has been received. If the determination in step S94 is YES, the processing proceeds to step S95, whereas if the determination is NO, the processing proceeds to step S102.

In step S95, the wireless communication module 37 determines whether at least one of the application IDs, which are included in the received connection response frame D7 and which are included in the application ID list of another apparatus, coincides with an application ID included in the application ID list of the own apparatus. If the determination in step S95 is YES, the processing proceeds to step S96, whereas if the determination is NO, the current passing communication process ends. The wireless communication module 37 stores the application ID list of the own apparatus in its own memory while the power supply is ON, and thereby performs the determination in step S95 by using the application ID list.

In step S96, the CPU 31 reads, from the passing box data 500 (see FIG. 7(1)), the transmission box data corresponding to the application having the application ID which is determined to have coincided with in step S95, and the wireless communication module 37 transmits to the communication counterpart apparatus (source of the connection response frame D7) the transmission box data in the form of being included in the data frame D8. Thereafter, the processing proceeds to step S97.

In step S97, the wireless communication module 37 stores in its own memory the MAC address of the communication counterpart apparatus (source of the connection response frame D7), and the time (response time) when the transmission box data has been transmitted in step S96. Thereafter, the processing proceeds to step S98. Here, the MAC address of the communication counterpart apparatus and the response time are used, in step S103 to be described later, to prevent communication with the same communication counterpart from occurring during a predetermined period of time from the response time. Accordingly, it is possible to avoid redundant communication with the same party during a short period of time. When a specified time has elapsed from the response time, the MAC address of the communication counterpart apparatus is deleted in steps S91 and S92, and the communication prevention is lifted.

In step S98, the wireless communication module 37 determines whether reception of the transmission box data (data frame D8) of the communication counterpart apparatus has been already performed. If the determination in step S98 is YES, the passing communication process ends, whereas if the determination is NO, the processing proceeds to step S99.

In step S99, the wireless communication module 37 executes a process of receiving the transmission box data 500*a* (data frame D8) from the communication counterpart apparatus. Since two game apparatuses 1 which perform the passing communication process transmit/receive the data frame D8 to/from each other, if the own game apparatus 1 is yet to receive the data frame D8, the processing proceeds to step S99. In step S99, if the own apparatus has received the transmission box data 500*a* from the communication counterpart apparatus, the processing proceeds to step S100, whereas if not, the passing communication process ends.

In step S100, the wireless communication module 37 gives an instruction to the CPU 31 to store the transmission box data of the communication counterpart apparatus having received in step S99 as the reception box data 500*b* of the own apparatus (see FIG. 7). In that case, the CPU 31 stores the transmission box data as a reception box data of an application represented by the application ID data attached to the transmission box data. That is, the CPU 31 stores the transmission box data in the reception box of the same application by using the application ID data. Thereafter, the processing proceeds to step S101.

In step S101, the wireless communication module 37 determines whether a process of transmitting the transmission box data (data frame D8) of the own apparatus has been already performed. If the determination in step S101 is YES, the passing communication process ends, whereas if the determination is NO, the process proceeds to step S96, thereby to perform the transmission process.

In step S102, the wireless communication module 37 determines whether the own apparatus has received the connection request frame D6 (see FIG. 19(1)) including the application ID list of the other apparatus. If the determination in step S102 is YES, the processing proceeds to step S103, whereas if the determination is NO, the passing communication process ends.

In step S103, the wireless communication module 37 determines whether the source MAC address is stored in its own memory. If the determination in step S103 is YES, the current passing communication process ends, whereas if the determination is NO, the processing proceeds to step S104. With this process, it is possible to avoid redundant communication with the same party during a short period of time.

In step S104, the wireless communication module 37 determines whether at least one of the application IDs, which are included in the received connection request frame D6 and which are included in the application ID list of the other apparatus, coincides with an application. ID included in the application ID list of the own apparatus. If the determination in step S104 is YES, the processing proceeds to step S105, whereas if the determination is NO, the current passing communication process ends. The wireless communication module 37 stores the application ID list of the own apparatus in its own memory while the power supply is ON, thereby performs the determination in step S104 by using the application ID list.

In step S105, the wireless communication module 37 generates the connection response frame D7 (see FIG. 19(2)) including the application ID list of the own apparatus, and transmits the connection response frame D7 to the communication counterpart apparatus (source of the connection request frame). Thereafter, the processing proceeds to step S106.

In step S106, the wireless communication module 37 stores in its own memory the MAC address of the communication counterpart apparatus (source of the connection request frame D6), and the time (response time) when the connection response frame D7 has been transmitted in step S105. Thereafter, the processing proceeds to step S99, and reception of the data frame D8 is performed. Here, the MAC address of the communication counterpart apparatus and the response time are used to prevent communication with the same communication counterpart during a predetermined time from the response time. Accordingly, it is possible to prevent redundant communication with the same party from occurring during a short period of time. When a specified time has elapsed from the response time, the MAC address of the communication counterpart apparatus is deleted in steps S91 and S92, and the communication prevention is lifted.

[Passing Application Process]

Next, description will be made on the passing application process realized by the CPU 31 executing the passing application, which is an example of the applications stored in the application storage area 100 of the saved data memory 34. FIG. 21 is a flowchart showing an example of the passing application process. The passing application process is an example of the application processes executed in step S12 in the main process shown in FIG. 8.

To begin with, in step S111, the CPU 31 determines whether there is new-arrival data in the reception box 500*b* of the passing application (see FIG. 7(2)). Specifically, the CPU 31 determines, through the passing communication process described with reference to FIG. 20, whether the metadata of the favorite application of another apparatus and the metadata of the most-recently-used application of the other apparatus is newly stored in the reception box 500*b* of the passing application. If the determination in step S111 is YES, the processing proceeds to step S112, whereas if the determination is NO, the processing proceeds to step S115.

In step S112, the CPU 31 imports the new-arrival data in the reception box 500*b* of the passing application into the main memory 32, thereby to empty the reception box 500*b* of the passing application (S113). Thereafter, the processing proceeds to step S114.

In step S114, the CPU 31 performs the metadata registration process in FIG. 10. Here, in the metadata registration process in step S114, the metadata of the favorite application and the metadata of the most-recently-used application of the other apparatus newly arrived in the reception box 500*b* of the passing application is the registration target metadata. Accordingly, if the registration target metadata is not registered in the own apparatus application area 201 or in the other apparatus application area 202, the registration target metadata is to be registered to the other apparatus application area 202 (S24). Meanwhile, if the registration target metadata is registered in the own apparatus application area 201 or in the other apparatus application area 202, the registration target metadata will not be registered to the metadata database 200 (NO in S26). Thereafter, the processing proceeds to step S115.

In step S115, the CPU 31 displays on the lower LCD 12 the list of the metadata of favorite applications and the metadata of most-recently-used applications of counterpart apparatuses (other apparatuses) which have been received through the passing communication process in the past (typically, icons and application names). Thereafter, the processing proceeds to step S116.

In step S116, the CPU 31 determines whether an operation of selecting any metadata has been performed by the user. If the determination in step S116 is YES, the processing proceeds to step S117, whereas if the determination is NO, the processing returns to step S115, and thereby the list of the metadata is continuously displayed.

In step S117, the CPU 31 performs the time-of-application selection process to be described later, obtains from the server 4 detailed information on the application corresponding to the metadata selected in step S116 and purchase information (guide information) included in the detailed information, and further, downloads the application itself from the server 4. Thereafter, the processing returns to step S115, and the list of the metadata is continuously displayed.

[Message Application Process]

Figure 22:
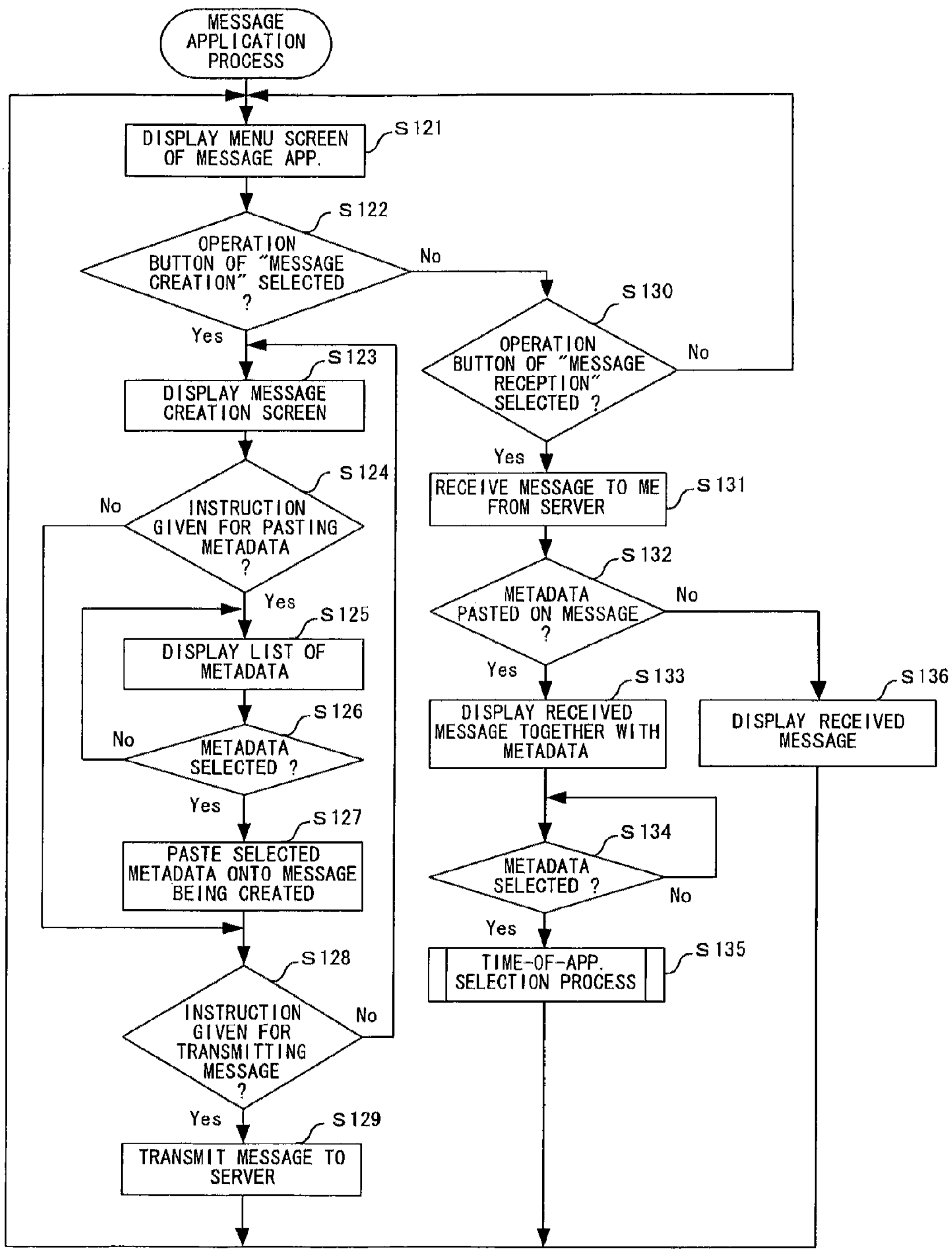
FIG. 22 is a flowchart showing an example of a message application process.

Next, description will be made on the message application process which is realized by the CPU 31 executing the message application which is an example of the applications stored in the application storage area 100 of the saved data memory 34. FIG. 22 is a flowchart showing an example of the message application process. The message application process is an example of the application processes executed in step S12 in the main process in FIG. 8.

To begin with, in step S121, the CPU 31 displays on the lower LCD 12 the main menu screen of the message application. The main menu screen includes an operation button of “message creation” and an operation button of “message reception”. Thereafter, the processing proceeds to step S122.

In step S122, the CPU 31 determines whether an operation of selecting the operation button of the message creation has been performed by the user. If the determination in step S122 is YES, the processing proceeds to step S123, whereas if the determination is NO, the processing proceeds to step S130.

In step S123, the CPU 31 displays the message creation screen on the lower LCD 12. Thereafter, the processing proceeds to step S124.

In step S124, the CPU 31 determines whether an operation of giving an instruction for pasting the metadata of the application onto the message has been performed by the user. If the determination in step S124 is YES, the processing proceeds to step S125, whereas if the determination is NO, the processing proceeds to step S128.

In step S125, the CPU 31 displays on the lower LCD 12 a list of metadata (typically, icons) stored in the metadata database 200. Thereafter, the processing proceeds to step S126.

In step S126, the CPU 31 determines whether an operation of selecting any metadata in the displayed list has been performed by the user. If the determination in step S126 is YES, the processing proceeds to step S127, whereas if the determination is NO, the processing returns to step S125, and thereby the list of the metadata is continuously displayed.

In step S127, the CPU 31 pastes the metadata selected by the user onto the message being created. Thereafter, the processing proceeds to step S128.

In step S128, the CPU 31 determines whether an operation of giving an instruction for transmitting a message has been performed by the user. If the determination in step S128 is YES, the processing proceeds to step S129, whereas if the determination is NO, the processing returns to step S123, and thereby the message creation screen is continuously displayed.

In step S129, the CPU 31 transmits to the server 4 by means of the wireless communication module 37 the message whose transmission instruction has been given. Thereafter, the processing returns to step S121, and a menu screen is displayed.

On the other hand, in step S130, the CPU 31 determines whether an operation of selecting the operation button of the message reception has been performed by the user. If the determination in step S130 is YES, the processing proceeds to step S131, whereas if the determination is NO, the processing returns to step S121, and thereby the menu screen is continuously displayed.

In step S131, the CPU 31 establishes connection with the server 4 by means of the wireless communication module 37 to receive a message to the own apparatus from the server 4. Thereafter, the processing proceeds to step S132.

In step S132, the CPU 31 determines whether the metadata (typically, icons) are pasted on the message received from the server 4. If the determination in step S132 is YES, the processing proceeds to step S133, whereas if the determination is NO, the processing proceeds to step S136.

In step S133, the CPU 31 displays on the lower LCD 12 or the like the message together with the pasted metadata. Thereafter, the processing proceeds to step S134.

In step S134, the CPU 31 waits until any of the metadata has been selected by the user's operation. Upon selection, the processing proceeds to step S135.

In step S135, the CPU 31 performs the time-of-application selection process to be descried later, and downloads from the server 4 detailed information on the application corresponding to the metadata selected in step S134, purchase information (guide information) included in the detailed information, and the application itself. Thereafter, the processing returns to step S121, and the display of the menu screen is performed.

On the other hand, in step S136, the CPU 31 displays the received message on the lower LCD 12 or the like. Thereafter, the processing returns to step S121, and display of the menu screen is performed.

[Time-of-Application Selection Process]

Hereinafter, with reference to FIG. 23, description will be made on the time-of-application selection process which is executed in step S117 in the passing application process in FIG. 21, and in step S135 in the message application process in FIG. 22. FIG. 23 is a flowchart showing an example of the time-of-application selection process.

Figure 21:
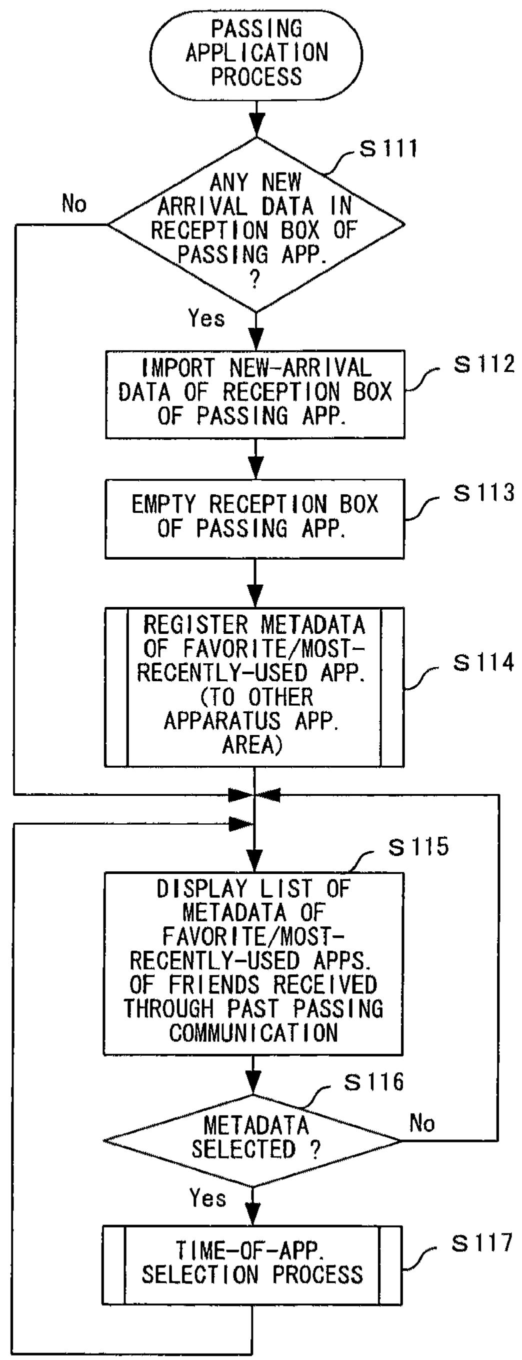
FIG. 21 is a flowchart showing an example of the passing application process.

To begin with, in step S141, the CPU 31 transmits, to the server 4 via the network 3, a request for downloading the detailed information on the application represented by the metadata which is determined to have been selected in step S116 in FIG. 21 or in step S134 in FIG. 22. In the request, the application ID corresponding to the metadata determined to have been selected is included. Thereafter, the processing proceeds to step S142.

In step S142, the CPU 31 waits for reception from the server 4 of the detailed information whose download request has been made in step S141. If the CPU 31 determines that the detailed information has been received from the server 4, the processing proceeds to step S143.

In step S143, the CPU 31 generates an application introduction screen based on the detailed information, and displays the screen on the lower LCD 12 or on the upper LCD 22. Thereafter, the processing proceeds to step S144. Here, in the application introduction screen, images introducing applications or explanations about applications are displayed, and in addition, information necessary for the user to determine purchase of applications, such as amounts of money (or points in place of money) required to purchase the applications is displayed. In addition, in some cases (if the determination in step S144 to be described later is YES), a user interface for receiving an application purchase operation by the user is provided in the application introduction screen. The user interface is typically a "buy button" clickable by the user), and the buy button is displayed so as to be clicked. If the application corresponding to the detailed information received in step S142 is not sold in the server 4, the user interface for receiving the application purchase operation by the user is not displayed in the application introduction screen (that is, the "buy button" is not displayed).

In step S144, the CPU 31 determines whether the operation button of the "buy button" is displayed in the application introduction screen displayed in step S134. If the determination in step S144 is YES, the processing proceeds to step S145, whereas if the determination is NO, the time-of-application selection process ends.

Here, the server 4 functions as a shop server (at least a server that offers the user interface for purchase by downloading (distributing via the Internet) the application corresponding to the received metadata, and usually a server having stored therein a plurality of applications which are to be downloaded), and the application introduction screen displayed in step S143 functions as an interface for allowing the user to purchase products (applications). The CPU 31 then uses the interface to determine whether the user has performed an application purchase operation. Specifically, in step S145, the CPU 31 determines whether the user has selected the operation button of the "buy button" displayed in the application introduction screen. If the determination in step S145 is YES, the processing proceeds to step S146, whereas if the determination is NO, the time-of-application selection process ends.

In step S146, the CPU 31 transmits to the server 4 a purchase request received as the operation (purchase operation) in step S145. Thereafter, the processing proceeds to step S147.

In step S147, the CPU 31 waits for reception from the server 4 of data of a final confirmation screen for allowing the user to perform final confirmation of application purchase, and advances the processing to step S148 when determining reception of the data of the final confirmation screen.

In step S148, the CPU 31 displays on the lower LCD 12 or the upper LCD 22 the final confirmation screen, based on the data of the final confirmation screen received in step S147. Here, in the final confirmation screen, an operation button of the "final confirmation" is displayed for allowing the user to make final confirmation of the purchase of the application displayed in the application introduction screen. Thereafter, the processing proceeds to step S149.

In step S149, the CPU 31 determines whether the user has selected the operation button of the "final confirmation" displayed in the final confirmation screen. If the determination in step S149 is YES, the processing proceeds to step S150, whereas if the determination is NO, the time-of-application selection process ends.

In step S150, the CPU 31 transmits to the server 4 the final purchase request and payment information. Here, the payment information includes, for example, a credit card number, a user ID issued for the service offered by the server 4, and the like. In the case where the payment information includes the credit card number or the like, the CPU 31 performs transmission of the payment information, upon the user's inputting of the number or the like. Thereafter, the processing proceeds to step S151.

In step S151, the CPU 31 waits for reception of the application purchased from the server 4, and advances the processing to step S152 upon reception of the application.

In step S152, the CPU 31 stores the received application in the saved data memory 34. Thereafter, the processing proceeds to step S153.

In step S153, the CPU 31 sets ON a present flag (see FIG. 5) corresponding to the application (application main body data 101) stored in step S152. Thereafter, the time-of-application selection process ends.

[Data Distribution Process by Server 4]

Figure 24:
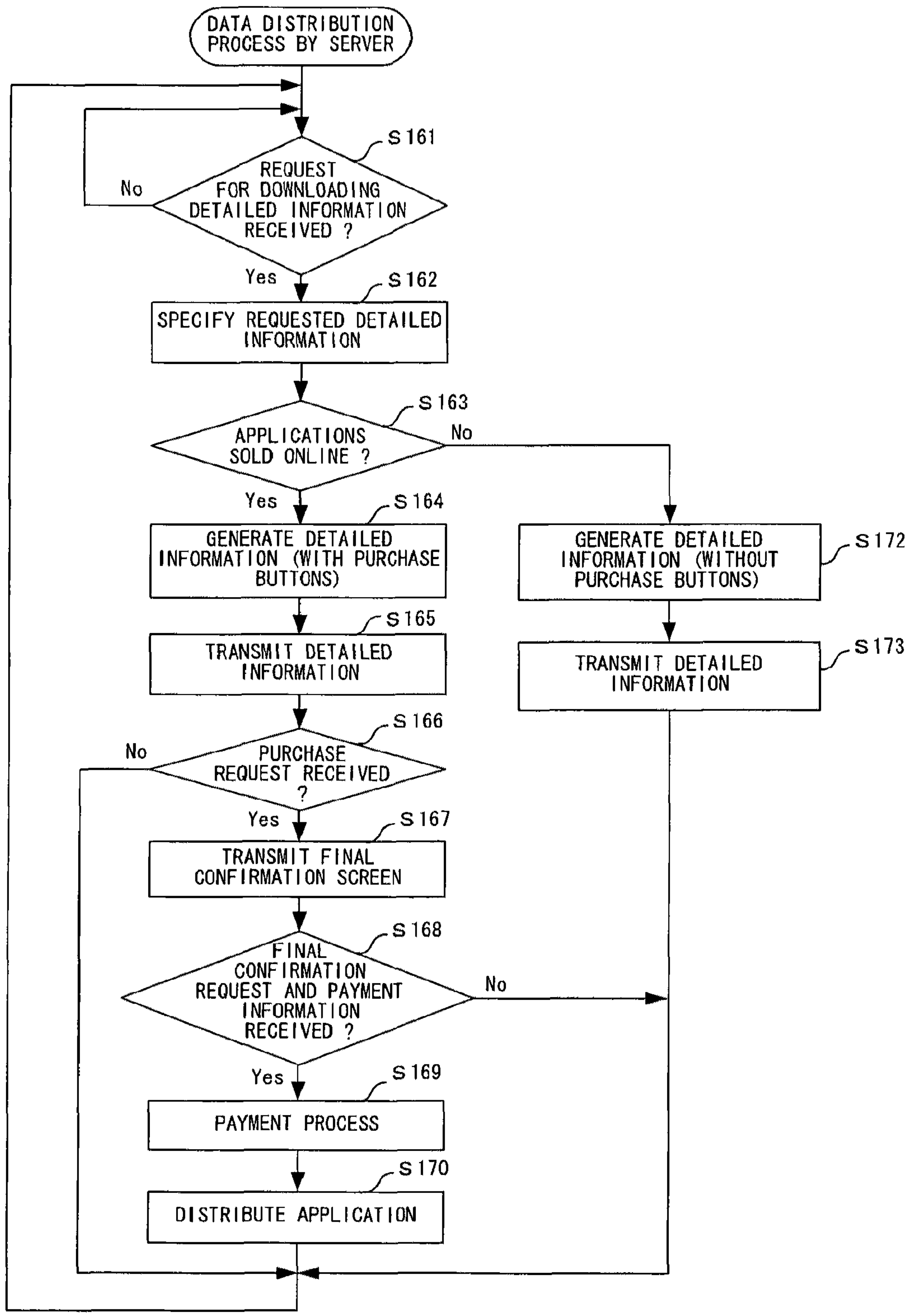
FIG. 24 is a flowchart showing an example of a data distribution process by a server.

Hereinafter, with reference to FIG. 24, description will be made on a data distribution process of the server 4 to distribute the above-described detailed information and applications to the game apparatus 1 which execute the time-of-application selection process. FIG. 24 is a flowchart showing an example of the data distribution process by the server 4. The process is executed when, for example, the server 4 is powered on, or when the server 4 is in a predetermined mode.

To begin with, in step S161, the CPU 65 waits for reception of a request for downloading detailed information, and advances the processing to step S122 upon reception of the request. The request is transmitted from the game apparatus 1 in step S141 in FIG. 23.

In step S162, the CPU 65 searches the table T (see FIG. 4) stored in the RAM 64 by using an application ID included in the request for downloading the detailed information received in step S161, thereby to specifies the detailed information of the application corresponding to the application ID. Thereafter, the processing proceeds to step S163.

In step S163, the CPU 65 refers to online sales information in the table T stored in the RAM 64, and determines whether the application corresponding to the application ID included in the request for downloading the detailed information received in step S161 is sold online from the server 4. If the determination in step S163 is YES, the processing proceeds to step S164, whereas if the determination is NO, the processing proceeds to step S172.

In step S164, the CPU 65 generates detailed information for allowing the game apparatus 1 to display the application introduction screen in step S143 in FIG. 23. Here, the detailed information generated in step S164 is used for displaying the application introduction screen including the operation button of the "buy button" described in step S145 in FIG. 23 or the like. Thereafter, the processing proceeds to step S165. That is, the detailed information generated in step S164 includes information necessary for the user to determine purchase of an application, such as an image or explanation for introducing the application, amounts of money required for purchasing the application, and also includes information for offering a user interface for allowing the user to perform an application purchase operation.

In step S165, the CPU 65 transmits the detailed information generated in step S164, via the network 3, to the game apparatus 1 (hereinafter, referred to as a destination game apparatus 1) having made the request for downloading the detailed information, which has been received in step S161. Thereafter, the processing proceeds to step S166.

In step S166, the CPU 65 waits for a predetermined period of time and determines whether the purchase request has been received from the destination game apparatus 1. The purchase request is transmitted by the destination game apparatus 1 in step S146 shown in FIG. 23. If the determination in step S166 is YES, the processing proceeds to step S167, whereas if the determination is NO, the processing returns to step S161.

In step S167, the CPU 65 reads, from the RAM 64, the data of the final confirmation screen, and transmits the data to the destination game apparatus 1 via the network 3. The data of the final confirmation screen is received by the destination game apparatus 1 in step S147 shown in FIG. 23. Thereafter, the processing proceeds to step S168.

In step S168, the CPU 65 waits for a predetermined period of time, and determines whether the final purchase request and payment information has been received from the destination game apparatus 1. The final purchase request and payment information is transmitted from the destination game apparatus 1 in step S150 shown in FIG. 23. If the determination in step S168 is YES, the processing proceeds to step S169, whereas if the determination is NO, the processing returns to step S161.

In step S169, the CPU 65 executes a payment process. The payment process is, for example, a payment process based on a credit card number. In addition, if the server 4 manages user points corresponding to user IDs, the payment process is a process of subtracting points corresponding to the value of an application to be distributed from the user points of a user. Thereafter, the processing proceeds to step S170.

In step S170, the CPU 65 distributes the application to be distributed to the destination game apparatus 1 via the network 3. The distributed application is received by the destination game apparatus 1 in step S151 in FIG. 23. Thereafter, the processing returns to step S121.

In step S172, the CPU 65 generates detailed information for displaying the application introduction screen of the application requested by the game apparatus 1 in step S141 in FIG. 23. Here, the detailed information generated in step S172 is used for displaying the application introduction screen which does not include the operation button of the "buy button" described, for example, in step S145 in FIG. 23. Thereafter, the processing proceeds to step S173.

In step S173, the CPU 65 transmits the detailed information to the destination game apparatus 1 via the network 3. Thereafter, the processing returns to step S161.

As described above, according to the present embodiment, the game apparatus 1 registers the metadata of applications executing by itself, and also registers the metadata of applications which are received through communication with other game apparatuses 1 based on various communication processes. Then, in the game apparatus 1, the registered metadata can be used for a plurality of applications. In addition, in the game apparatus 1, even the metadata of a card application, which is stored in a cartridge 29 that has been mounted to the game apparatus 1 in the past but is not currently mounted thereto (i.e., an application that has been executed on the own apparatus in the past, but is not currently present in the own apparatus), can be used for various applications.

[Modified Example of Present Embodiment]

In the present embodiment, the metadata of a DL application is registered to the metadata database 200 when the icon is changed from the present icon display mode to the unique icon display mode. However, the metadata of the DL application may be registered to the metadata database 200 when the DL application is activated. In this case, in the main process in FIG. 8, the metadata registration process in step S16 is performed immediately after the determination of NO in step S15.

Further, in the present embodiment, the metadata of a card application is registered to the metadata database 200 when a cartridge 29 is inserted to the game apparatus 1. However, the metadata of the card application may be registered to the metadata database 200 when the application in the cartridge 29 is activated instead of the insertion. In this case, in the main process in FIG. 8, the metadata registration process in step S4 is performed immediately after the determination of YES in step S19.

In addition, in the present embodiment, the metadata of built-in applications is registered to the metadata database 200 each time a built-in application is initially activated. However, the metadata of all the built-in applications may be registered collectively to the metadata database 200 when any of the built-in applications is activated. Further, the metadata of all the built-in applications may be registered to the metadata database 200 as a default setting of the game apparatus 1.

Further, in the present embodiment, there may be included an application that is not registered to the metadata database 200.

Further, applications using the metadata are not limited to the applications described in the present embodiment (such as the friend application, play history application, and passing application). For example, the metadata may be used for various applications such as a racing game application, a sport game application.

Further, how the metadata is used is not limited to that described in the present embodiment. For example, it may be possible to set such that, in accordance with the destination (selling area) represented by the metadata of the destination data 102*h* (see FIG. 6(1)), the metadata (e.g., icon) of applications which do not correspond to the destination of the game apparatus 1 will not be displayed. Further, for example, it may be possible to set such that the age of a user is registered in advance to the game apparatus 1, and based on the metadata of the rating data 102*i* of applications and on the age of the user, the metadata (e.g., icon) of applications that do not satisfy the conditions will not be displayed.

Further, in the present embodiment, the metadata is stored in the own apparatus application area and in the other apparatus application area separately (see FIG. 6(2)). However, the metadata may not be stored separately.

Further, in the present embodiment, when the version of applications varies, the metadata representing the respective versions are registered to the metadata database 200 (see S21 in FIG. 10). However, in the present embodiment, the metadata of a new version may be registered to the metadata database 200 in a manner as to be overwritten onto that of the old version.

Further, in the present embodiment, as to the metadata that is already registered in the metadata database 200, the additional registration will not be performed, or the overwriting is not performed (see FIG. 10). However, overwriting may be performed.

Further, in the present embodiment, metadata to be accumulated and stored in the application storage area 100 in FIG. 5 (i.e., metadata of built-in applications and DL applications) is always stored together with the corresponding application as a set. However, the metadata may be downloaded from the server 4 upon activation of an application, associated with the corresponding application, and stored in the application storage area 100 in FIG. 5. In this case, upon activation of a built-in application or DL application, the game apparatus 1 transmits the application ID to the server 4 thereby to download necessary metadata. Further, it may be set such that the metadata (limited to the metadata of applications which are already marketed at the time of release of the game apparatus 1) is built in the saved data memory 34 or the like of the game apparatus 1 from the beginning, and the metadata is associated with the corresponding application upon activation of the application thereby to be stored in the application storage area 100 in FIG. 5.

Further, in the present embodiment, an application and metadata are stored as a set in a cartridge 29 (or a memory card 28), and when the cartridge 29 or the like is inserted into the game apparatus 1, the metadata is registered to the metadata database 200 (see S2 and S4 in FIG. 8). However, it may be set such that the metadata is not stored in the cartridge 29 or the like, and the metadata is downloaded from the server 4 when the cartridge 29 or the like is inserted into the game apparatus 1 thereby to be registered to the metadata database 200.

Further, in the present embodiment, a card application is stored in a cartridge 29 or memory card 28. However, the card application may be stored in an optical disc or another type of storage medium.

Further, in the present embodiment, the present invention is applied to a handheld game apparatus 1, but the present invention is not limitedly applied to the game apparatus. For example, the present invention is applicable to a mobile phone, a personal handyphone system (PHS), a PDA, and the like. In addition, the present invention is also applicable to a stationary game apparatus, a personal computer, and the like.

Further, in the present embodiment, a single server 4 performs the above-described processes. However, a plurality of servers may be used to realize the above-described processes. For example, it may be configured such that a server performs a process of offering detailed information to the game apparatus 1, another server performs a process of causing the game apparatus 1 to display a payment screen (payment-related information), and still another server performs a payment process, thereby to transmit to the game apparatus 1 its purchased application. Still further, in the present embodiment, a single game apparatus 1 performs the above-described processes. However, a plurality of apparatuses communicably connected to one another may be used to realize the above-described processes.

Further, in the present embodiment, a card application is not stored in the application storage area 100 (see FIG. 5). However, a card application may be configured to be accumulated and stored in the application storage area 100 together with the corresponding metadata upon mounting of the cartridge 29 or the like, similarly to the DL application. That is, the card application may be configured such that if a cartridge 29 has been once mounted to the game apparatus 1, the card application thereof is accumulated in the game apparatus 1, and is kept executable even after the cartridge 29 or the like is dismounted. In this case, a process of storing, in the application storage area 100, the card application and metadata stored in a cartridge 29 having been inserted into the game apparatus 1 is to be additionally performed immediately before step S4 in FIG. 8.

Further, in the present embodiment, it may be possible to configure such that even if the user of the game apparatus 1 has deleted a built-in application or DL application having been once stored in the game apparatus 1, the metadata or the like corresponding to such an application remains in the saved data memory 34 without being deleted. With this configuration, the metadata of applications deleted from the game apparatus 1 can be also utilized.

Further, in the present embodiment, the shape of the game apparatus 1, the shapes, numbers, installation positions of the various operation buttons 14, the touch panel 13, and the like are merely examples, and it is understood that other shapes, numbers and installation positions may be employed to realize the present invention. In addition, the processing orders used for the above-described information processing, setting values, values used for determination, and the like are merely examples, and it is understood that other orders and values may be employed within the scope of the present invention to realize the present invention.

Further, in the present embodiment, various programs such as the main process program 80 is stored in a nonvolatile memory (saved data memory 34, see FIG. 5) in the game apparatus 1. However, these programs may be stored in a CD-ROM, a DVD, and like optical disc-type storage media, a flexible disc, a hard disc, a magneto-optical disc, a magnetic tape, and the like. Still further, these programs may be stored in a volatile memory, which is a temporary storage medium.

While the invention has been described in detail, the foregoing description is in all aspects illustrative and not restrictive. It will be understood that numerous other modifications and variations can be devised without departing the invention.

What is claimed is:

1. An information processing apparatus comprising:

a metadata storage section;

a transceiver configured to communicate with one or more other information processing apparatuses; and a processing system including at least one processor coupled to a memory, the processing system configured to:

automatically, using the transceiver, receive and transmit metadata with the one or more other information processing apparatuses;

execute one or more application programs;

accumulate and store, into the metadata storage section, metadata corresponding to the one or more application programs when the application programs have been executed or become executable; and execute the one or more application programs by using the metadata stored in the metadata storage section.

2. The information processing apparatus according to claim 1, wherein the processing system is further configured to:

execute a first application program which uses the metadata stored in the metadata storage section; and execute a second application program which uses the metadata.

3. The information processing apparatus according to claim 2, wherein the first application program is an application program that performs a first information process by using the metadata stored in the metadata storage section, and the second application program is an application program that performs a second information process which is different from the first information process, by using the metadata stored in the metadata storage section.

4. The information processing apparatus according to claim 2, wherein the first application program is an application program that outputs in a first mode the metadata stored in the metadata storage section, and the second application program is an application program that outputs in a second mode the metadata stored in the metadata storage section which is different from the first mode.

5. The information processing apparatus according to claim 1, wherein the processing system is further configured to:

transmit, using the transceiver, the metadata stored in the metadata storage section to one or more other information processing apparatuses;

receive, using the transceiver, metadata from the one or more other information processing apparatuses; and accumulate and store metadata received from the one or more other information processing apparatuses into the metadata storage section.

6. The information processing apparatus according to claim 5, further comprising:

a input device configured to receive an operation by a user of the information processing apparatus for specifying one or more of the other information processing apparatuses, wherein the processing system is further configured to:

transmit, using the transceiver, the metadata stored in the metadata storage section to the specified one or more of the other information processing apparatuses; and receive, using the transceiver, metadata transmitted from the one or more of the other information processing apparatuses.

7. The information processing apparatus according to claim 5, wherein the application program outputs the metadata received from the one or more other information processing apparatuses, the processing system is further configured to:

receive a selection operation by the user of selecting any of the outputted metadata;

obtain detailed information on an application program corresponding to the metadata selected by the selection operation; and output the obtained detailed information.

8. The information processing apparatus according to claim 7, wherein the obtained detailed information is obtained from a server computing apparatus.

9. The information processing apparatus according to claim 7, wherein the detailed information includes guide information for guiding the user to purchase the application program corresponding to the metadata selected by the selection operation.

10. The information processing apparatus according to claim 9, wherein, the information processing apparatus performs a predetermined transaction process with a server in order to purchase the application program, and the processing system is further configured to receive and obtain from the server the detailed information including the guide information in accordance with reception of the selection operation.

11. The information processing apparatus according to claim 10, wherein the guide information is information for purchase operation guidance which guides the user to purchase the application program corresponding to the metadata selected by the selection operation, wherein the processing system is further configured to:

receive the purchase operation performed by the user in accordance with the guide information;

transmit, to the server, a request for purchasing the application program whose purchase operation has been; and receive, from the server, the application program whose purchase has been requested for.

12. The information processing apparatus according to claim 10, wherein the guide information is information for purchase operation guidance which guides the user to purchase the application program corresponding to the metadata selected by the selection operation, the processing system is further configured to:

a receive the purchase operation performed by the user in accordance with the guide information;

transmit to the server a request for purchasing the application program whose purchase operation has been received;

receive, from the server, payment-related information for providing the user with guidance on operations for inputting payment information;

output the payment-related information;

receive from the user the input of the payment information performed in accordance with the guidance in the payment-related information;

transmit to the server the received payment information; and receive from the server the application program whose purchase has been requested for.

13. The information processing apparatus according to claim 1, wherein the processing system is further configured to:

repeatedly search, using the transceiver, for the one or more other information processing apparatuses that are present in a short distance wireless communication range; and automatically establish, using the transceiver, wireless connection the one or more other information processing apparatuses so as to perform the automatic reception or transmission of the metadata with one or more other information processing apparatuses.

14. The information processing apparatus according to claim 1, further comprising a reading device configured to read data from an external storage medium which has stored therein an application program and metadata corresponding to the application program, and which is detachably mountable to the information processing apparatus, wherein the processing system is further configured to accumulate and store, into the metadata storage section, the metadata stored in the external storage medium when data in the external storage medium is read by the reading device.

15. The information processing apparatus according to claim 1, wherein the processing system is further configured to output a list of executable application programs, wherein when any of the application programs in the list has been selected via a user input operation, the selected application program is executed, and the processing system is further configured to accumulate and store, into the metadata storage section, the metadata corresponding to the selected application program.

16. The information processing apparatus according to claim 1, wherein the processing system is further configured to: output a list of executable application programs;

execute a selected application program; and in accordance with output of the list, accumulate and store, into the metadata storage section, the metadata corresponding to the application programs included in the list.

17. The information processing apparatus according to claim 1, wherein the application programs obtain execution time representing how long the application programs have been executed within a predetermined period of time, and output the metadata corresponding to the application programs whose execution time satisfies a predetermined condition.

18. The information processing apparatus according to claim 1, wherein the application programs create a list of metadata stored in the metadata storage section, and output the list.

19. The information processing apparatus according to claim 1, wherein the metadata includes icons representing the application programs.

20. The information processing apparatus according to claim 1, wherein the metadata includes titles of the application programs.

21. An information processing system comprising:

a storage medium configured to store metadata;

a transceiver configured to communicate with at least one remote computing apparatus; and a processing system including at least one processor, the processing system configured to:

execute one or more application programs; and accumulate metadata corresponding to the one or more application programs when the application programs have been executed or become executable;

store, into the metadata storage section, the accumulated metadata; and automatically, via the transceiver, communicate metadata with the remote computing apparatus, wherein the one or more application programs use the stored metadata.

22. A non-transitory computer-readable storage medium having stored therein an information processing program to be executed by a computer of an information processing apparatus provided with a metadata storage section and a transceiver that is configured to communicate with at least one remote computing apparatus, the information processing program including instructions that, when executed by the computer, are configured to:

execute one or more application programs;

receive or transmit metadata, via the transceiver, with the at least one remote computing apparatus without user prompting for such reception or transmission; and accumulate and store, into the metadata storage section, metadata corresponding to the one or more application programs when the application programs have been executed or become executable, wherein the one or more application programs use the metadata stored in the metadata storage section when executed.

23. An information processing method, comprising:

executing one or more application programs on a processing system of a computing apparatus, the computing apparatus including a transceiver that is configured to communicate with at least one other computing apparatus;

receiving or transmitting metadata, via the transceiver, with the at least one remote computing apparatus without user intervention for such reception or transmission; and accumulating and storing, into the metadata storage section by using the processing system, metadata corresponding to the executed or executable one or more application programs when the application programs have been executed or become executable, wherein the one or more executed application programs are executed by using the metadata stored in the metadata storage section.

24. An information processing apparatus comprising:

a storage medium configured to store first metadata for a first application;

a transceiver configured to communicate with a second computing apparatus;

a user input device configured to receive input from a user; and a processing system that includes at least one processor, the processing system configured to:

execute the first application in accordance with user provided input;

store, to the storage medium, metadata for the first application in accordance with the execution of the first application;

automatically communicating, via the transceiver, with the second computing apparatus to receive second metadata for a second application;

store the received second metadata for the second application to the storage medium; and present a display output to the user based on the stored second metadata.

25. The information processing apparatus of claim 24, wherein the processing system is further configured to:

search, via the transceiver, for the second computing apparatus that is present within a short distance wireless communication range;

automatically, via the transceiver, establish a wireless connection with the second computing apparatus to facilitate reception of the second metadata for the second application.

26. The information processing apparatus of claim 24, wherein the second application is not, at the time of reception of the second metadata, installed or currently usable by the processing system.

27. The information processing apparatus of claim 24, wherein the automatically communicating further includes the processing system being configured to transmit, via the transceiver, first metadata of the first application to the second computing apparatus.

* * * * *